US010330967B2

(12) United States Patent
Tamaki et al.

(10) Patent No.: US 10,330,967 B2
(45) Date of Patent: Jun. 25, 2019

(54) DISPLAY DEVICE AND DISPLAY PANEL

(71) Applicant: Japan Display Inc., Tokyo (JP)

(72) Inventors: Masaya Tamaki, Tokyo (JP); Shinji Fujisawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 11 days.

(21) Appl. No.: 15/383,549

(22) Filed: Dec. 19, 2016

(65) Prior Publication Data

US 2017/0176796 A1    Jun. 22, 2017

(30) Foreign Application Priority Data

Dec. 22, 2015   (JP) ................................. 2015-250256

(51) Int. Cl.
| | |
|---|---|
| *G02F 1/1333* | (2006.01) |
| *G02F 1/1335* | (2006.01) |
| *G09G 3/36* | (2006.01) |
| *G02B 5/02* | (2006.01) |

(52) U.S. Cl.
CPC .... *G02F 1/13336* (2013.01); *G02F 1/133504* (2013.01); *G02F 1/133528* (2013.01); *G09G 3/3648* (2013.01); *G02B 5/0257* (2013.01); *G09G 2300/026* (2013.01); *G09G 2300/0413* (2013.01)

(58) Field of Classification Search
CPC .......... G02F 1/13336; G02F 1/133504; G09G 3/3648; G09G 2300/026; G09G 2300/0413
See application file for complete search history.

(56) References Cited

U.S. PATENT DOCUMENTS

| | | | |
|---|---|---|---|
| 5,559,617 A | * | 9/1996 | Mitsui ................. G02F 1/13363 349/117 |
| 6,104,457 A | | 8/2000 | Izumi et al. |
| 2004/0032554 A1 | | 2/2004 | Yoon et al. |
| 2008/0074344 A1 | | 3/2008 | Lee et al. |
| 2008/0117161 A1 | | 5/2008 | Hu |

(Continued)

FOREIGN PATENT DOCUMENTS

| | | |
|---|---|---|
| JP | S61-138286 A | 6/1986 |
| JP | H04-110992 A | 4/1992 |

(Continued)

OTHER PUBLICATIONS

Japanese Office Action dated Apr. 16, 2019 for corresponding Japanese Application No. 2015-250256.

*Primary Examiner* — Ricardo Osorio
(74) *Attorney, Agent, or Firm* — Michael Best & Friedrich LLP

(57) ABSTRACT

In a display device, a plurality of display panels displaying an image formed by a plurality of pixels are coupled to each other. Each of the display panels includes a display surface having a display region and a non-display region surrounding the display region, and a polarizer provided on the display surface. The polarizer covers the display region and a part of the polarizer extends to the non-display region. A pair of display panels to be coupled to each other are arranged such that parts of the non-display regions overlap with each other. One display panel is located at a display surface side of the other display panel, and the other display panel is located at a rear surface side of the one display panel, the rear surface side being an opposite side to the display surface side.

19 Claims, 30 Drawing Sheets

(56) References Cited

U.S. PATENT DOCUMENTS

| | | |
|---|---|---|
| 2010/0115807 A1 | 5/2010 | Shim et al. |
| 2012/0250158 A1 | 10/2012 | Tamaki et al. |
| 2013/0093646 A1* | 4/2013 | Curtis .................. G06F 3/1446 345/1.3 |
| 2013/0301263 A1 | 11/2013 | Yamanaka |
| 2014/0049449 A1* | 2/2014 | Park ......................... G09G 5/00 345/1.3 |
| 2015/0301667 A1* | 10/2015 | Yano .................... G06F 3/0412 345/173 |
| 2016/0357059 A1* | 12/2016 | Xu .................... G02F 1/133528 |

FOREIGN PATENT DOCUMENTS

| | | |
|---|---|---|
| JP | H11-024047 A | 1/1999 |
| JP | 2004-117539 A | 4/2004 |
| JP | 2005-536768 A | 12/2005 |
| JP | 2008-083701 A | 4/2008 |
| JP | 2008-129583 A | 6/2008 |
| JP | 2009-162972 A | 7/2009 |
| JP | 2010-066706 A | 3/2010 |
| JP | 2010-117717 A | 5/2010 |
| JP | 2012-208408 A | 10/2012 |
| JP | 2013-156452 A | 8/2013 |
| JP | 2013-156452 A | 2/2014 |
| JP | 2014-032314 A | 2/2014 |
| JP | 2015-114529 A | 6/2015 |
| WO | 2012/102349 A1 | 8/2012 |

* cited by examiner

DISPLAY DEVICE AND DISPLAY PANEL

CROSS-REFERENCE TO RELATED APPLICATIONS

This application claims priority from Japanese Application No. 2015-250256, filed on Dec. 22, 2015, the contents of which are incorporated by reference herein in its entirety.

BACKGROUND

1. Technical Field

The present invention relates to a display device and an display panel.

2. Description of the Related Art

As disclosed in Japanese Patent Application Laid-open Publication No. 2009-162972 A, multi-display apparatuses provided so as to be capable of displaying an image larger than an image that one display device can display by aligning and integrally using a plurality of display devices displaying images have been known. In these multi-display apparatuses, each of the aligned display devices has a non-display region on the outer periphery of a display region and the plurality of display devices are arranged such that the respective non-display regions overlap with each other. The overlap of the non-display regions generates steps between the respective display regions.

The display device is provided with a polarization plate on a display surface thereof in some cases. Generally, the polarization plate has a margin extending to the non-display region on the outer periphery of the display region. When the display devices provided with the polarization plates are simply arranged such that the non-display regions overlap with each other with the same mechanism as that of the conventional multi-display apparatuses, the thicknesses of the polarization plates are added to the thicknesses of members forming the respective non-display regions of the display devices. That is to say, the steps resulting from the overlap of the non-display regions are enlarged with the thicknesses of the polarization plates. As the steps become larger, an image to be processed integrally is viewed as if the image is partitioned, resulting in a problem in that display quality of the image is adversely influenced.

For the foregoing reasons, there is a need for a display device and an display panel that can prevent steps generated between a plurality of display regions from being viewed even when the display device is provided with a polarization plate on a display surface thereof.

SUMMARY

According to one aspect, a display device having a plurality of display panels, which display an image formed by a plurality of pixels, coupled to each other. Each of the display panels includes a display surface having a display region and a non-display region surrounding the display region, and a polarizer provided on the display surface. The polarizer covers both the display region and a part of the the non-display region. A pair of display panels are coupled with stacking a part of the non-display region each other. One display panel is located at a display surface side of the other display panel as a front-panel, and the other display panel is located at a rear surface side of the front-panel as a rear-panel, the rear surface side opposed to the display surface side. A side surface located closest to the front-panel of side surfaces of the polarizer included the rear-panel side surface opposes a side surface located closest to the rear-panel of side surfaces of the front-panel side surface.

According to one aspect, a display panel included in a display device having a coupled display region in which a plurality of display panels each including a display part having a plurality of pixels are coupled and that is larger than a display region by the display part. The display panel includes a display surface having a display region and a non-display region surrounding the display region; and a polarizer provided on the display surface. The polarizer covers the display region and a part of the non-display region except positions overlapping with other display panels.

DETAILED DESCRIPTION

Hereinafter, respective embodiments of the present invention will be described with reference to the drawings. The disclosure is merely an example and it is needless to say that the range of the present invention encompasses appropriate changes within the scope of the invention of which those skilled in the art can easily conceive. The drawings represent widths, thicknesses, shapes, and the like of respective parts schematically in comparison with those in actual modes in some cases in order to make description more clear but they are merely examples and do not limit the interpretation of the present invention. In the present specification and the respective drawings, the same reference numbers denote similar elements to those described before with reference to the already referred drawings and detailed description thereof is appropriately omitted in some cases.

Figure 1:
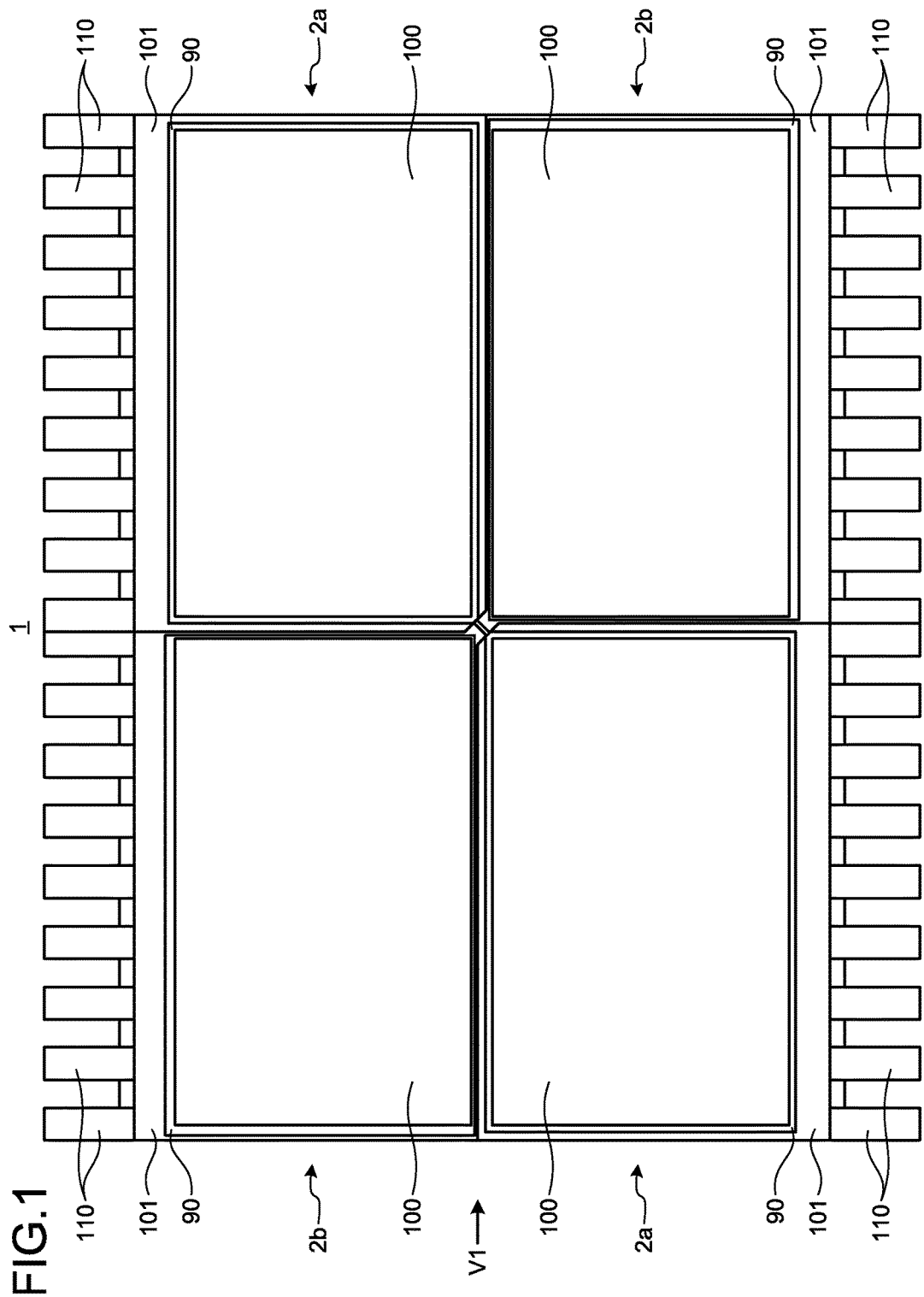
FIG. 1 is a view illustrating an example of the configuration of a display device according to an embodiment of the present invention.

FIG. 1 is a view illustrating an example of the configuration of a display device 1 according to an embodiment of the present invention. As illustrated in FIG. 1, the display device 1 is configured by coupling a plurality of display panels 2 (for example, display panels 2a and 2b) displaying images formed by a plurality of pixels 50. With this configuration, the display device 1 has a coupled display region larger than a display region 100 by a display part 95 of one display panel 2. As illustrated in FIG. 1, the display device 1 has the coupled display region in which four rectangular display panels 2 are coupled two by two along two orthogonal directions (for example, the X direction and the Y direction, which will be described later). To be more specific, the two display panels 2a and the two display panels 2b are coupled such that the display regions 100 included in the respective panels are aligned in an arrangement of 2×2 along the X direction and the Y direction that are orthogonal to each other.

First, the display panels 2 (display panels 2a, 2b, 2c, 2d, 2e, $2a_1$ to $2a_9$, and $2b_1$ to $2b_9$) will be described. Each display panel 2 is a flat panel-type (planar-type) display panel. Examples of the flat panel-type display panel include, but are not limited to, a display panel using a liquid crystal display (LCD) panel, a display panel using an electro luminescence (EL) display panel, a display panel using a plasma display (PD) panel, etc. Each display panel 2 used in the present invention may be any of these display panels.

There are a transmissive display panel, a reflective display panel, and a transflective display panel having reflective and transflective characteristics in combination as for display modes that these flat panel-type display panels can employ. The display mode of the display panel 2 used in the present invention may be any of them. In description with reference to FIG. 1 and the like, the display panel 2 is assumed to use the reflective liquid crystal display panel. The reflective liquid crystal display panel may or may not have a what-is-called memory in pixel (MIP) function.

Although the display panel 2 is a color display-compliant display panel as an example, it may be a monochrome display-compliant display panel. In the color display-compliant display panel, one unit pixel 5 as a unit forming a color image includes the pixels 50 functioning as a plurality of sub pixels. To be more specific, in the color display-compliant display panel, the unit pixel 5 includes, for example, three pixels 50 of a pixel 50R displaying red (R), a pixel 50G displaying green (G), and a pixel 50B displaying blue (B) (see FIG. 5). Hereinafter, the description of the pixel 50 is not intended to distinguish colors of the pixels 50R, 50G, and 50B from each other. The unit pixel 5 is not limited to the combination of the pixels 50R, 50G, and 50B corresponding to three primary colors of RGB. The unit pixel 5 may be formed by adding another (other) pixel(s) 50 corresponding to equal to or more than one color(s) to the pixels 50R, 50G, and 50B corresponding to the three primary colors of RGB. To be more specific, the above-mentioned another (other) pixel(s) 50 may be the pixel 50 displaying white (W) for improving luminance or may be the pixel(s) 50 displaying at least one color among colors (for example, cyan (C), magenta (M), and yellow (Y)) as complementary colors for RGB, for example. The colors of these pixels 50 correspond to colors of color filters 22.

Figure 2:
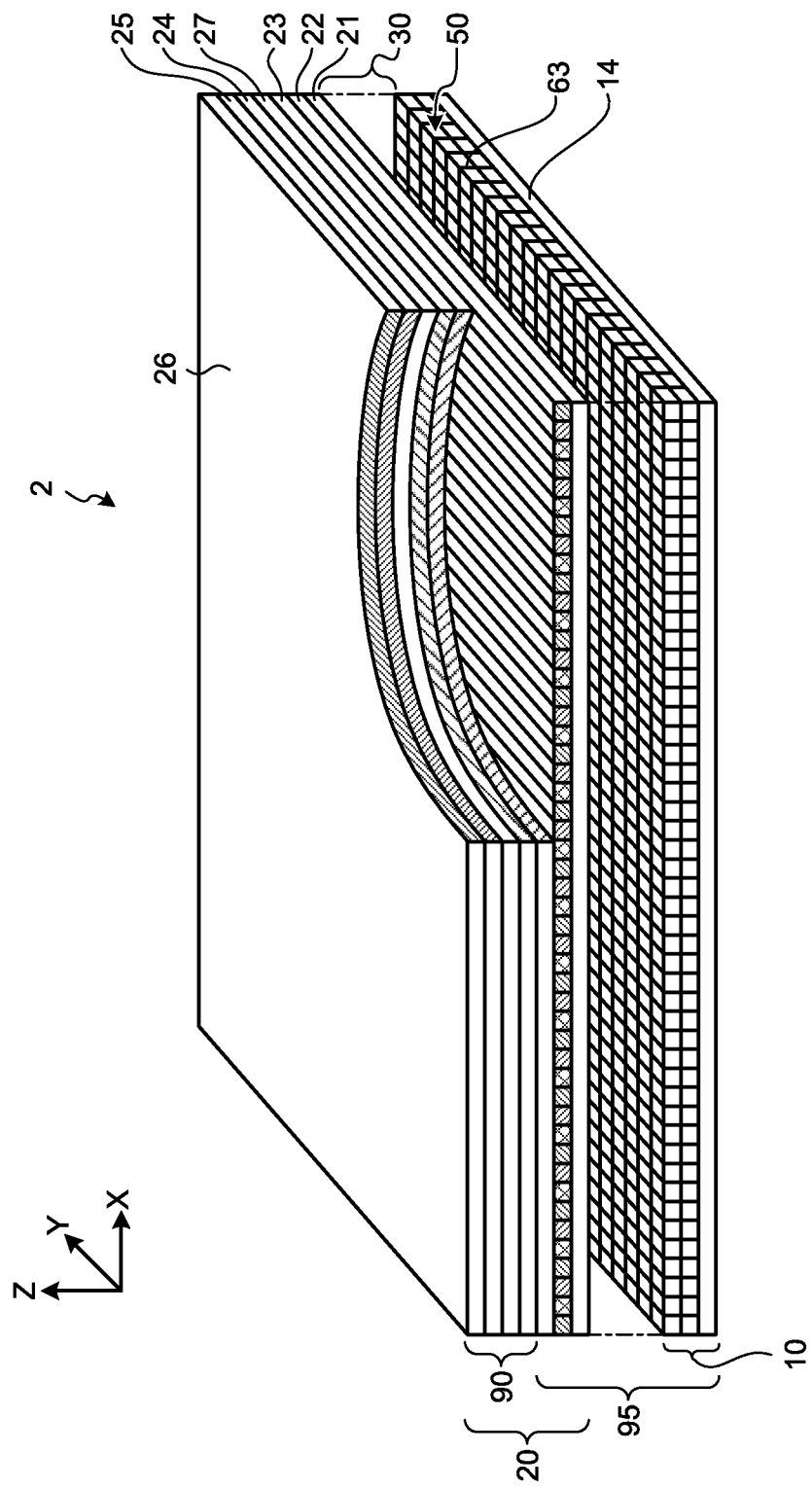
FIG. 2 is a cross-sectional view illustrating the schematic configuration of a display panel.
Figure 3:
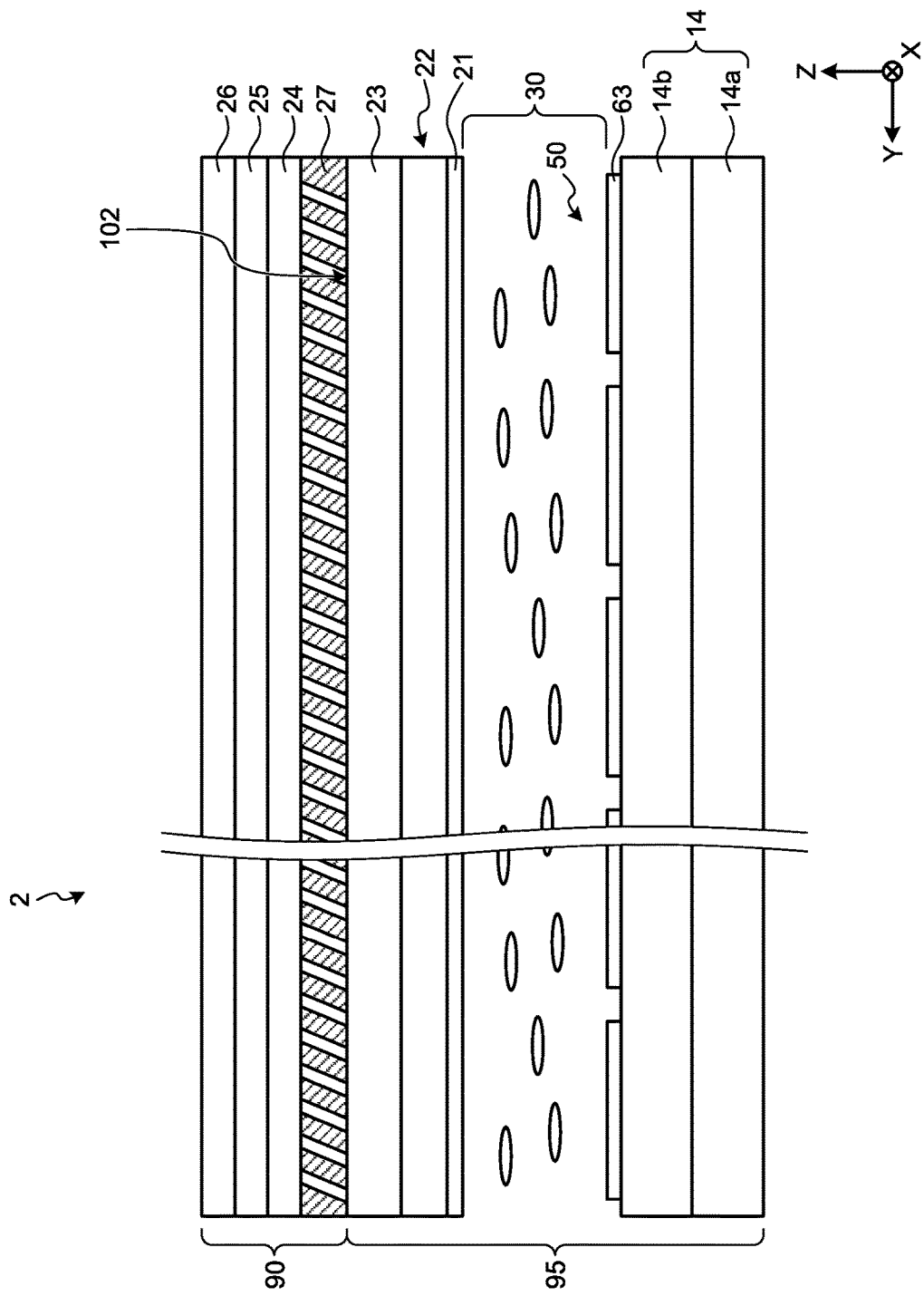
FIG. 3 is a cross-sectional view illustrating the schematic configuration of the display panel.

FIG. 2 and FIG. 3 are cross-sectional views illustrating the schematic configuration of the display panel 2. As illustrated in FIG. 2 and FIG. 3, the display panel 2 includes a first panel unit (TFT substrate) 10, a second panel unit (CF substrate) 20, and a liquid crystal layer 30 as main components. In the second panel unit 20, a polarizer 90 is laminated on a display surface 102 of a second substrate 23. A display surface side of the display panel 2 is the side that the display surface 102 faces the polarizer 90. The first panel unit 10 and the second panel unit 20 are arranged so as to oppose each other with a predetermined gap interposed therebetween through a spacer (not illustrated). The liquid crystal layer 30 is formed by enclosing a liquid crystal material into the gap between the first panel unit 10 and the second panel unit 20. To be more specific, the liquid crystal layer 30 is formed by enclosing the liquid crystal material into the gap between the first panel unit 10 and the second panel unit 20 that is sealed with a seal member SE (see FIG. 15) provided so as to border the periphery of a region in which the pixels 50 are arranged.

Figure 4:
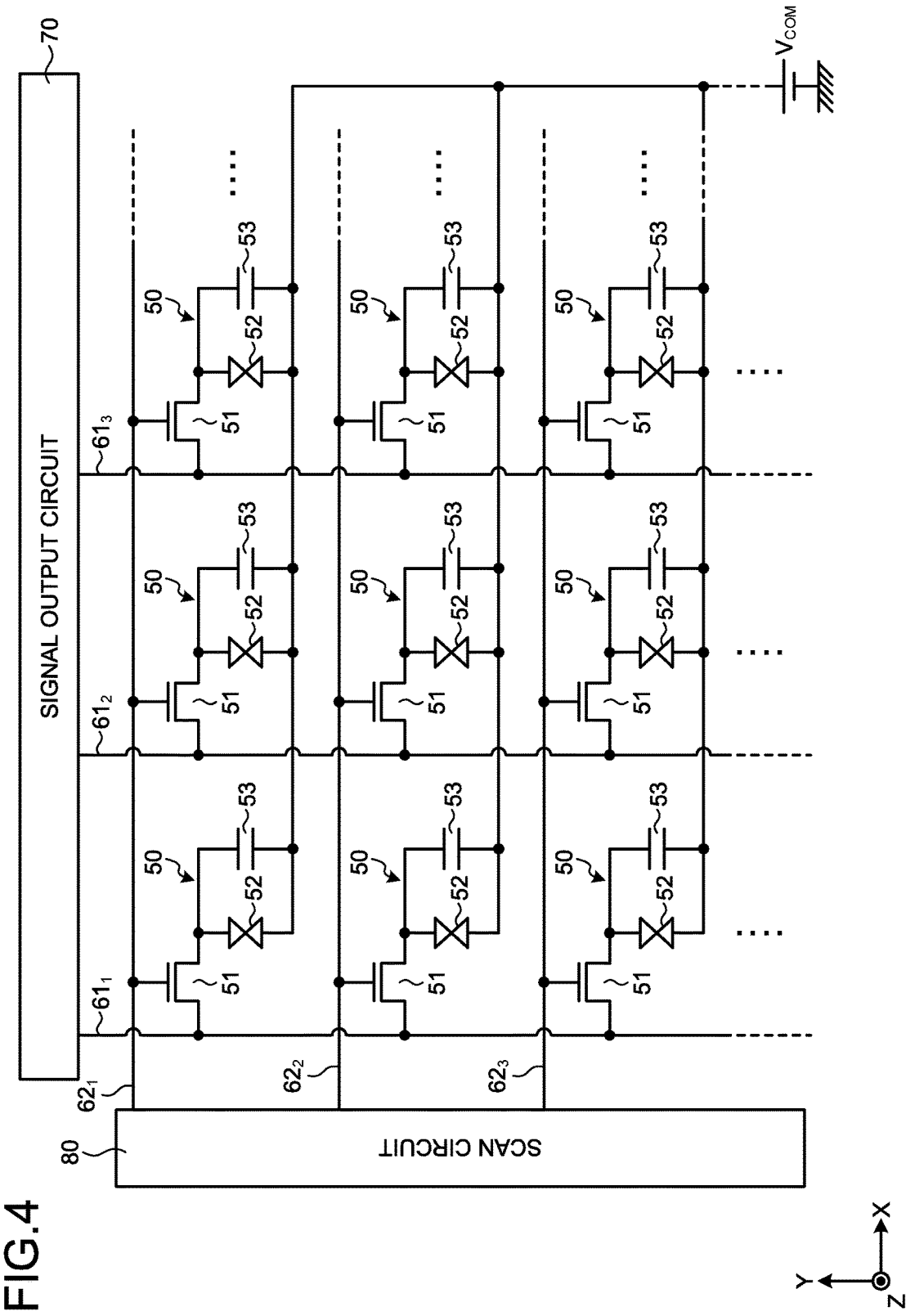
FIG. 4 is a schematic view illustrating an example of the circuit configuration as a main configuration of a display part of the display panel.

FIG. 4 is a schematic view illustrating an example of the circuit configuration as a main configuration of the display part 95 of the display panel 2. The first panel unit 10 includes a first substrate 14 formed with a transparent glass or the like as a substrate material and reflection electrodes 63 formed on the first substrate 14 at the liquid crystal layer 30 side. The first substrate 14 includes a circuit substrate 14a formed on a substrate and a flattening film 14b laminated on the circuit substrate 14a. The circuit substrate 14a has a plurality of scan lines 62 ($62_1$, $62_2$, $62_3$, etc.) and a plurality of signal lines 61 ($61_1$, $61_2$, $61_3$, etc.). In the following description, the extension direction of the scan lines 62 is referred to as the X direction (row direction) and the extension direction of the signal lines 61 is referred to as the Y direction (columnar direction) in some cases. The X direction and the Y direction are orthogonal to each other. Although the pixels 50 connected to the scan lines 62 and the signal lines 61 are arranged, for example, in a form of matrix extending in the XY directions, this arrangement of the pixels 50 is an example. The arrangement is not limited thereto and can be appropriately changed.

To be more specific, the plurality of scan lines 62 and the plurality of signal lines 61 are wired on the first substrate 14 so as to intersect with each other, as illustrated in FIG. 4. The pixels 50 are arranged on the first substrate 14 corresponding to intersection positions between the scan lines 62 and the signal lines 61. The plurality of signal lines 61 are wires for transferring to the pixels 50 a signal driving the pixels 50, that is, a video signal that is output from a signal output circuit 70 for each pixel column. The plurality of scan lines 62 are wires for transferring a signal selecting the pixels 50 row by row, that is, a scan signal that is output from a scan circuit 80 for each pixel row. One ends of the signal lines 61 are connected to output terminals, corresponding to respective columns, of the signal output circuit 70. One ends of the scan lines 62 are connected to output terminals, corresponding to respective rows, of the scan circuit 80.

Each pixel 50 includes a switching element 51, a liquid crystal capacitor 52, and a holding capacitor 53, for example. The switching element 51 is a switch such as a thin film transistor (TFT), for example. A gate electrode of the switching element 51 is connected to one of the plurality of scan lines 62 and a source electrode thereof is connected to one of the plurality of signal lines 61.

The liquid crystal capacitor 52 is a capacitor component of a liquid crystal material that is generated between a pixel electrode (for example, corresponding to the reflection electrode 63) and a counter electrode (for example, corresponding to a transparent electrode 21) formed to oppose the pixel electrode. The pixel electrode is connected to a drain electrode of the switching element 51. In the color display-compliant display panel as in the embodiment, the pixel electrodes correspond to the reflection electrodes 63 formed for the respective pixels 50. A common potential $V_{COM}$ of direct-current (DC) voltage is commonly applied to the counter electrodes of all the pixels. One electrode of the holding capacitor 53 is connected to the pixel electrode of the liquid crystal capacitor 52 and the other electrode thereof is connected to the counter electrode of the liquid crystal capacitor 52.

The flattening film 14b is formed at the surface side of a wiring layer 14c (see FIG. 15 and the like) that is mounted as circuit elements of the first substrate 14, the signal lines 61, and the scan lines 62 and flattens the surface of the first panel unit 10. The reflection electrodes 63 are formed on the flattening film 14b for the respective pixels 50.

The reflection electrodes 63 reflect external light that has been incident thereon from the outside after transmitting through the second panel unit 20 and the liquid crystal layer 30. The display part 95 of the display panel 2 that has the plurality of pixels 50 performs display output with reflection light from the reflection electrodes 63.

The first substrate 14 is referred to as a TFT substrate in some cases because the circuit elements including the TFTs are formed thereon. The first substrate 14 in the embodiment has the configuration in which the respective parts are formed on the glass substrate but may be a substrate using a material other than glass. The circuit substrate 14a may use a material shielding light or a material reflecting light.

The second panel unit 20 includes the transparent electrode 21 formed with indium tin oxide (ITO) or the like, the color filters 22, the second substrate 23 formed with a transparent glass or the like as a substrate material, and the polarizer 90 in this order toward the display surface side from the liquid crystal layer 30 side, for example.

Figure 5:
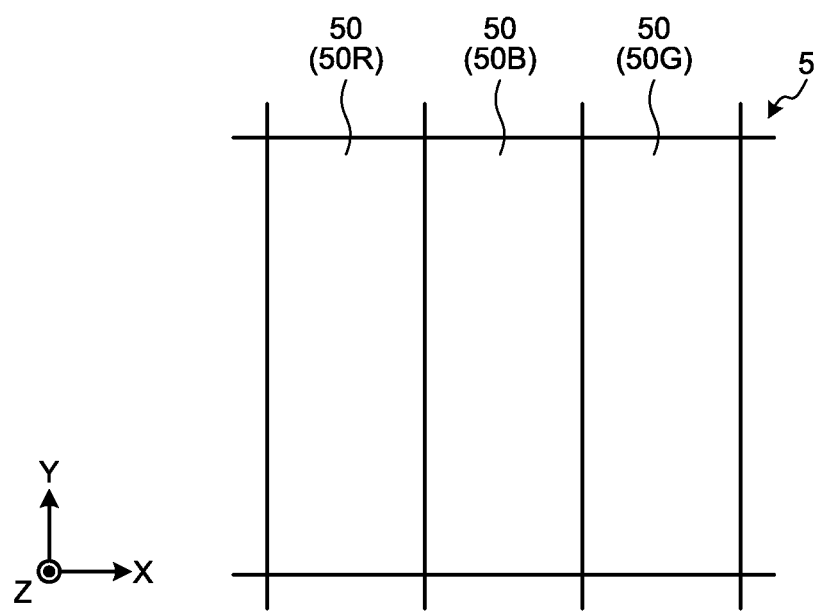
FIG. 5 is a schematic view illustrating an example of colors and arrangement of pixels with color filters.

FIG. 5 is a schematic view illustrating an example of colors and arrangement of the pixels 50 with the color filters 22. The color filters 22 have the configuration in which respective stripe-shaped filters of R, G, and B that extend in the columnar direction (Y direction) are repeatedly aligned at the same pitch as the pitch of the pixels 50 in the row direction (X direction), for example. The second substrate 23 is referred to as a CF substrate in some cases because it includes the color filters (CF) 22. The reflection light from the reflection electrode 63 passes through the color filter 22 and is thereby viewed as light of a color corresponding to the color of the color filter 22. Although in FIG. 5, the plurality of pixels 50 arranged in the stripe-form configure the unit pixel 5, the specific arrangement and shapes of the pixels 50 included in the unit pixel 5 can be appropriately changed.

The color filters 22 are not necessarily provided for all the pixels 50. To be specific, a light shield BM instead of the color filters 22 is provided for some pixels 50 located in the vicinity of the seal member SE (see FIG. 15). The light shield BM includes, for example, a light shielding member provided so as to be continuous to a black matrix located between the color filters 22 of the respective colors. The pixels 50 with the light shield BM are dummy pixels that are not used for display output.

The polarizer 90 includes a polarization plate 26, a ½ wavelength plate 25, a ¼ wavelength plate 24, and an anisotropic scattering member (LCF) 27 in this order from the display surface side to the opposite side (rear surface side) of the display surface 102, for example. The polarization plate 26 is a plate-like polarizer formed with resin such as poly-vinyl alcohol (PVA) as a main body. The ¼ wavelength plate 24 and the ½ wavelength plate 25 are phase difference plates formed with a birefringent material such as crystal and mica as a main body. The ¼ wavelength plate 24 applies phase difference of $\pi/2$ ($=\lambda/4$) to an electric field vibration direction (polarization plane) of the incident light. The ½ wavelength plate 25 applies phase difference of $\pi$ ($=\lambda/2$) to the electric field vibration direction of the incident light. The polarization plate 26 polarizes external light from the display surface side to provide linearly polarized light in a predetermined direction, and then, the ½ wavelength plate 25 rotates a polarization plane thereof by 90 degrees. There-after, the ¼ wavelength plate 24 converts it into circularly polarized light and it reaches the anisotropic scattering member 27. Thus, the display panel 2 includes the polarizer 90 provided at the display surface side of the display part 95 and having at least the polarization plate 26.

Figure 6:
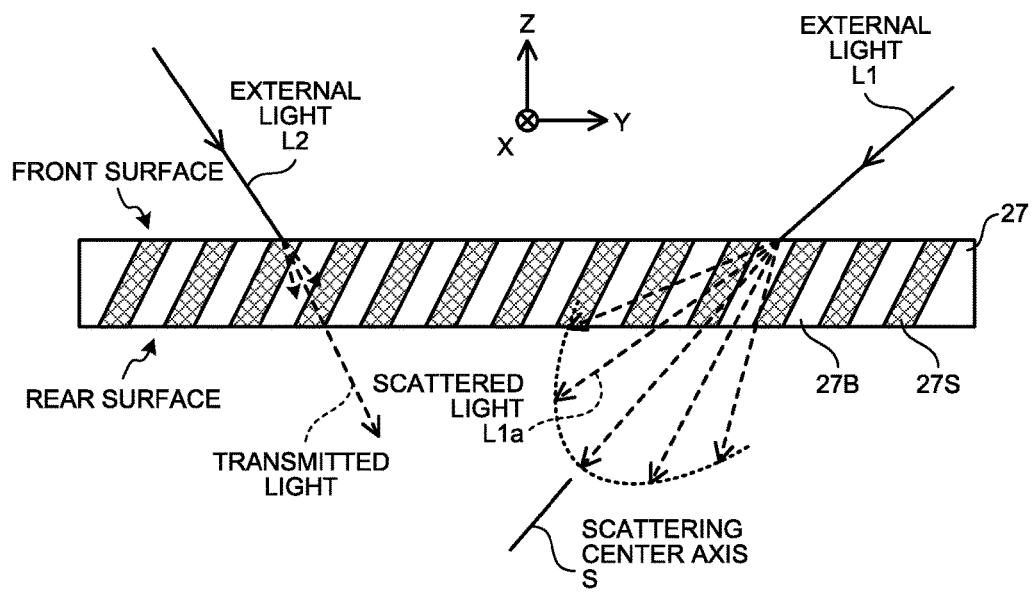
FIG. 6 is a cross-sectional view illustrating an anisotropic scattering member on which external light is incident through the front surface thereof.
Figure 7:
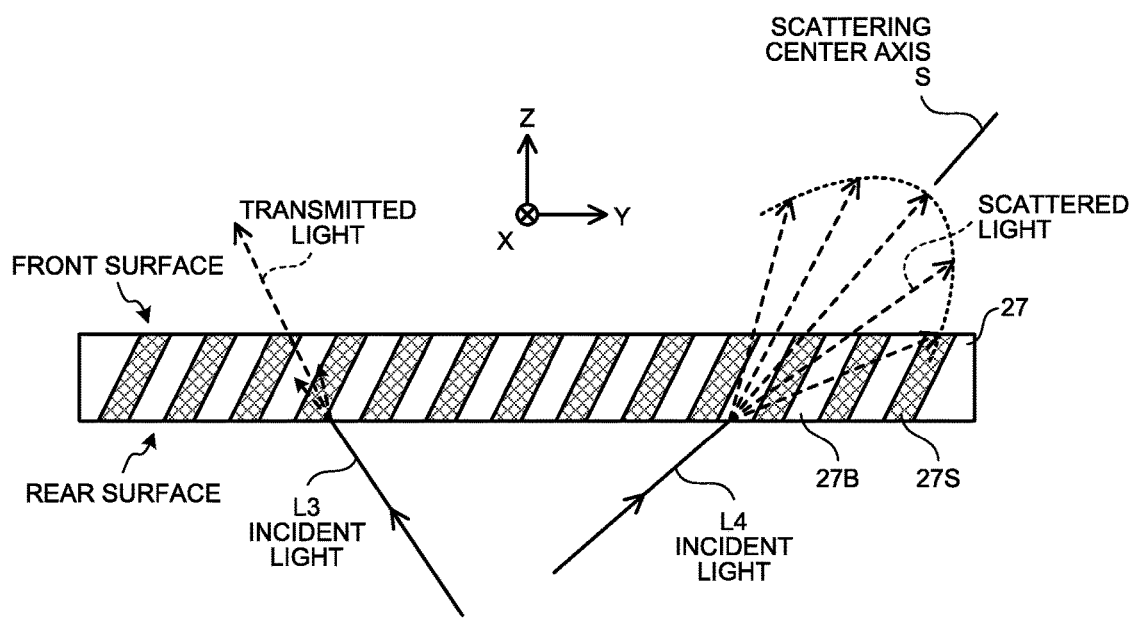
FIG. 7 is a cross-sectional view illustrating the anisotropic scattering member on which incident light is incident through the rear surface thereof.
Figure 8:
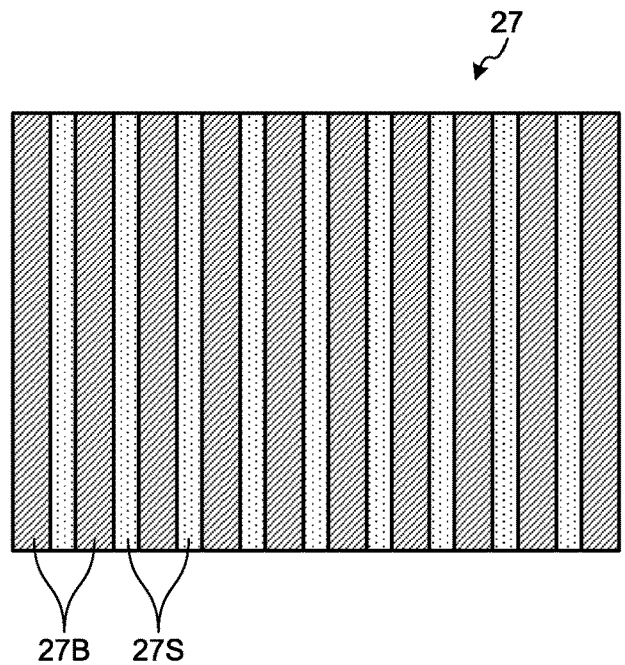
FIG. 8 is a plan view illustrating an example of the anisotropic scattering member.
Figure 9:
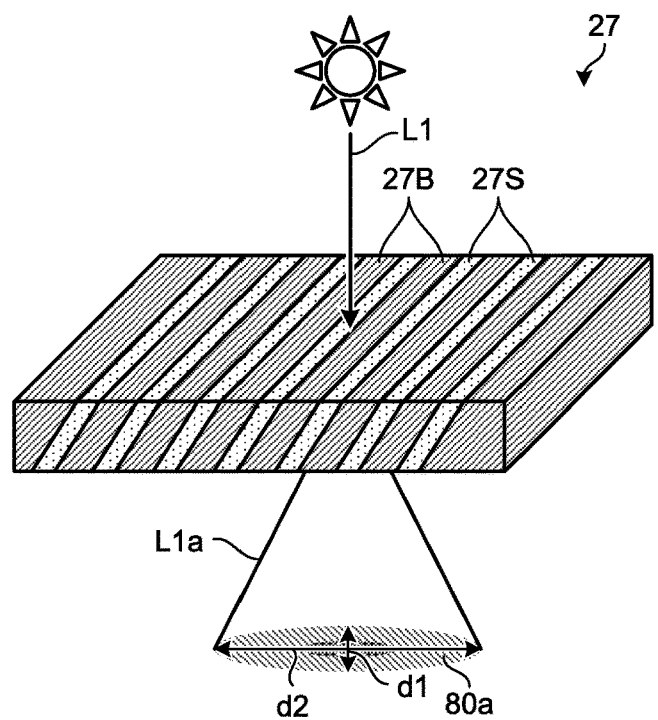
FIG. 9 is a schematic view for explaining functions of the anisotropic scattering member.
Figure 10:
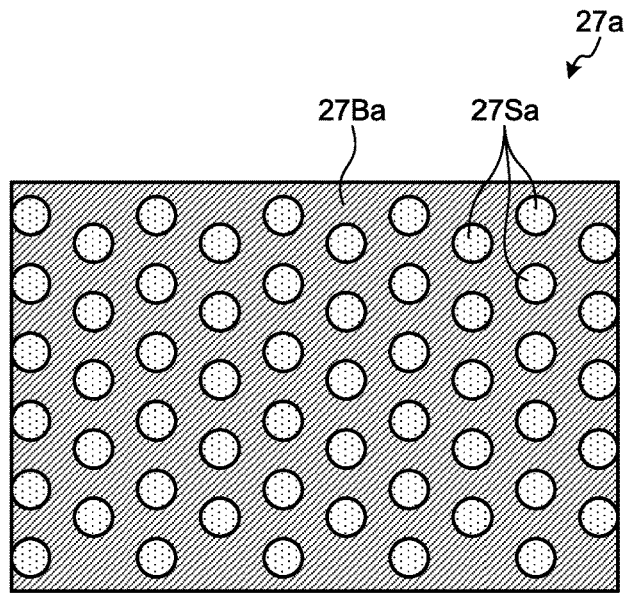
FIG. 10 is a plan view illustrating another example of the anisotropic scattering member.
Figure 11:
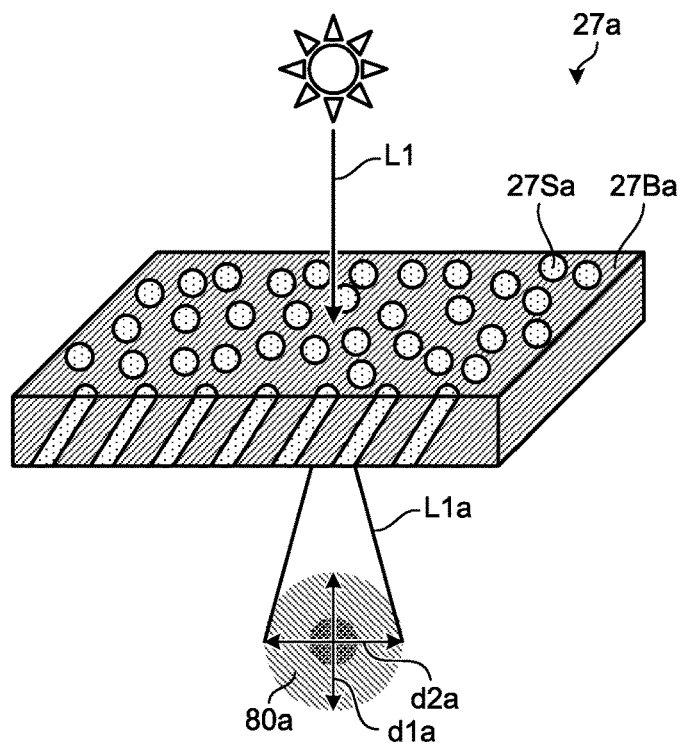
FIG. 11 is a schematic view for explaining functions of the anisotropic scattering member.

FIG. 6 is a cross-sectional view illustrating the anisotropic scattering member on which the external light is incident through the front surface thereof. FIG. 7 is a cross-sectional view illustrating the anisotropic scattering member on which incident light is incident through the rear surface. FIG. 8 is a plan view illustrating an example of the anisotropic scattering member. FIG. 9 is a schematic view for explaining functions of the anisotropic scattering member. FIG. 10 is a plan view illustrating another example of the anisotropic scattering member. FIG. 11 is a schematic view for explaining functions of the anisotropic scattering member. The anisotropic scattering member 27 is a sheet-like member scattering light. As the anisotropic scattering member 27, for example, a light control film (LCF) can be used.

As illustrated in FIG. 6 and FIG. 7, the anisotropic scattering member 27 has first regions 27B and second regions 27S and the regions 27B and 27S of the two types have different refractive indices. The anisotropic scattering member 27 may have a louver configuration in which the plurality of plate-like second regions 27S are aligned between the first regions 27B at predetermined intervals as illustrated in FIG. 8 and FIG. 9 or may have a columnar configuration in which columnar second regions 27Sa are aligned in a first region 27Ba as illustrated in FIG. 10 and FIG. 11. In the embodiment, the first regions 27B are formed with a material having a lower refractive index than that of the second regions 27S. The first regions 27B are formed with a material having a relatively low refractive index in the anisotropic scattering member 27 and serve as low refractive index regions. The second regions 27S are formed with a material having a relatively high refractive index in the anisotropic scattering member 27 and serve as high refractive index regions.

The anisotropic scattering member 27 is anisotropic for light scattering. To be specific, the anisotropic scattering member 27 is, for example, a forward scattering layer with relatively high forward scattering and relatively low rearward scattering. To be more specific, the anisotropic scattering member 27 scatters light that has been incident thereon from a specific direction (scattering axis direction). When light (for example, external light) is incident on the anisotropic scattering member 27 from the specific direction at the polarization plate 26 side based on a relation with the second substrate 23, the anisotropic scattering member 27 transmits the incident light with less scattering and largely scatters light (reflected light) returned after being reflected by the reflection electrode 63. The anisotropic scattering member 27 is arranged such that light is scattered when the light is incident thereon through the surface with a relatively large degree of change in the refractive index in the vicinity of the boundary between the first region (low refractive index region) 27B and the second region (high refractive index region) 27S and the light is emitted through the surface with a relatively small degree of change in the refractive index in the vicinity of the boundary between the low refractive index region 27B and the high refractive index region 27S.

For example, as illustrated in FIG. 6, the anisotropic scattering member 27 scatters external light L1 when the external light L1 is incident on the anisotropic scattering member 27 from a predetermined direction (scattering axis direction) based on the relation with the second substrate 23 whereas the anisotropic scattering member 27 transmits external light L2 when the external light L2 is incident on the anisotropic scattering member 27 from another predetermined direction (direction other than the scattering axis direction). The anisotropic scattering member 27 transmits the external light L2 when the external light L2 is incident on the anisotropic scattering member 27 from another predetermined direction and scatters the transmitted light that has been reflected by the reflection electrode 63 in a predetermined range around the scattering center axis S. The external light L1 and the external light L2 are parallel light beams that are incident on the polarization plate 26 of the second panel unit 20. The external light L1 and the external light L2 may be non-polarized light or polarized light. For example, as illustrated in FIG. 7, also when incident light L3 and incident light L4 are incident from the opposite side to the external light L1 and the external light L2, the anisotropic scattering member 27 scatters the light that has been incident thereon from the predetermined direction (scattering axis direction) based on the relation with the second substrate 23 while transmitting the light that has been incident thereon from another predetermined direction (direction other than the scattering axis direction) in the same manner. To be specific, the anisotropic scattering member 27 transmits the incident light L3 when the incident light L3 is incident thereon from the predetermined direction based on the relation with the second substrate 23 while scattering the incident light L4 when the incident light L4 is incident thereon from another predetermined direction. The predetermined directions in which the external light L1 and the incident light L4 are incident are the same directions only with orientations inverted by 180 degrees. The predetermined directions in which the external light L2 and the incident light L3 are incident are the same directions only with orientations inverted by 180 degrees. It is sufficient that light scattering occurs while the light passes through the anisotropic scattering member 27 and the light may be scattered at the time of incidence, at the time of emission, or at the time when passing through.

When the anisotropic scattering member 27 has the louver configuration illustrated in FIG. 8, as illustrated in FIG. 9, a diffusion range 80a of scattered light L1a after the anisotropic scattering member 27 scatters the external light L1 has such an elliptical shape that a diameter d1 thereof in the direction of the long sides of the first regions 27B and the second regions 27S is a minor axis and a diameter d2 thereof in the direction of the short sides of the first regions 27B and the second regions 27S (in the alignment direction of the first regions 27B and the second regions 27S) is a major axis. The anisotropic scattering member 27 also scatters the light reflected from the reflection electrode 63 into the elliptical shape in the same manner.

When an anisotropic scattering member 27a has the columnar configuration illustrated in FIG. 10, as illustrated in FIG. 11, a diffusion range 80a of the scattered light L1a after the anisotropic scattering member 27a scatters the external light L1 has such a circular shape that a diameter d1a and a diameter d2a are the same. The anisotropic scattering member 27a scatters the light reflected from the reflection electrode 63 into the circular shape in the same manner.

For example, the anisotropic scattering member 27 has the configuration in which the first regions 27B and the second regions 27S extend in the thickness direction and are inclined in a predetermined direction. The anisotropic scattering member 27 is formed by, for example, irradiating a resin sheet as a mixture of equal to or more than two types of photopolymerizable monomers or oligomers having different refractive indices with ultraviolet rays obliquely. The anisotropic scattering member 27 may have the configuration different from the above-mentioned configuration or may be produced by a method different from the above-mentioned method. The anisotropic scattering member 27 may be formed by a single layer or a plurality of layers. When the anisotropic scattering member 27 is formed by the plurality of layers, the layers may have the same configuration or different configurations. The anisotropic scattering member 27 may be omitted.

Figure 12:
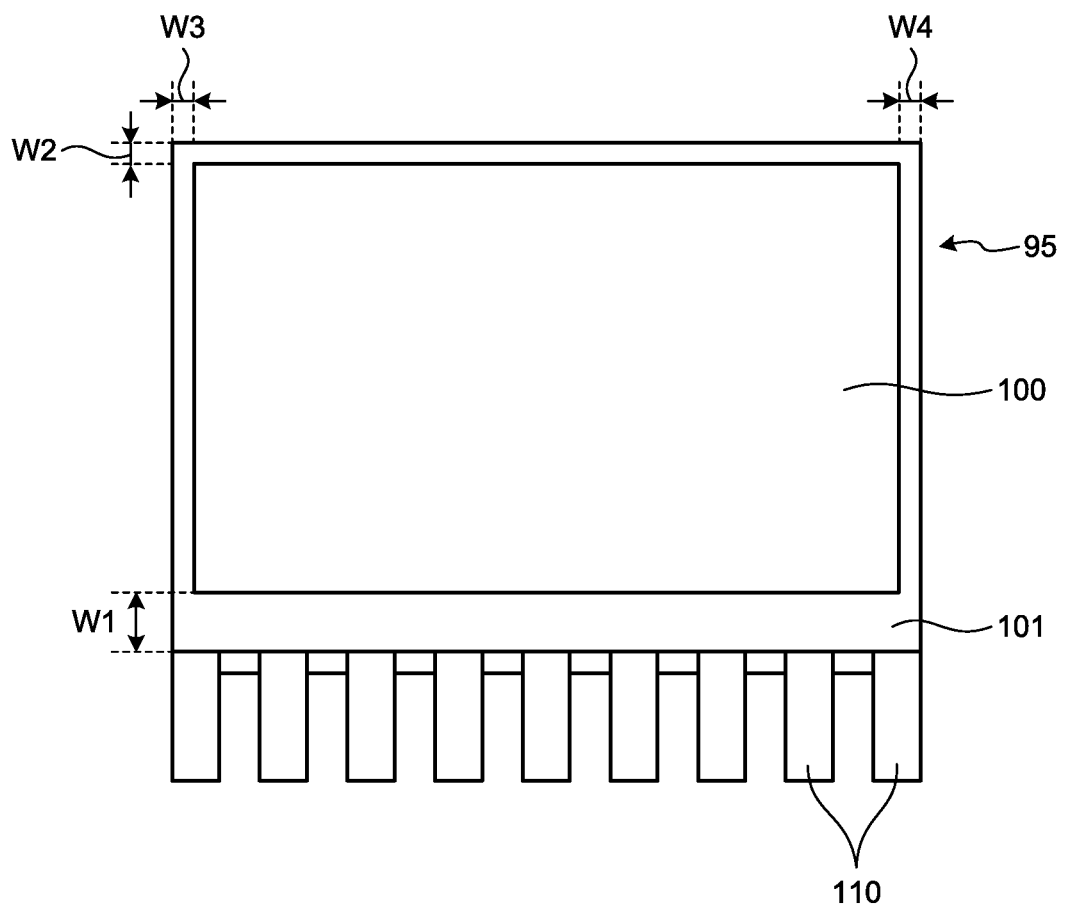
FIG. 12 is a schematic plan view illustrating the display panel in a state where no polarizer is provided when seen from the display surface side.

Next, arrangement of the polarizers 90 in the display panels 2 (the display panels 2a and 2b) and overlap between the display panels 2 (the display panels 2a and 2b) will be described. FIG. 12 is a schematic plan view illustrating the display panel 2 without the polarizer 90 when seen from the display surface side. In the following description, the display panel 2 without polarizer 90 corresponds to the display part 95. The display part 95 includes the display surface 102 having the display region 100 and a non-display region 101 surrounding the display region 100. To be specific, the display part 95 displays an image at the display surface side while a region provided with the color filters 22 is used as the display region 100. To be more specific, the display part 95 displays an image with the pixels 50 corresponding to the positions at which the color filters 22 are provided, among the plurality of pixels 50, for example, based on image data transferred from an external configuration through wires 110. The display part 95 in the embodiment has the rectangular display region 100 and the frame-like non-display region 101 having four sides bordering the display region 100.

The non-display region 101 is a region located on the periphery of the region having therein the plurality of pixels 50 for which the color filters 22 are provided in the display part 95. To be specific, the light shield BM shielding light between the pixels 50 and the display surface 102 and forming the boundary between the display region 100 and the non-display region 101 is provided in the non-display region 101. The pixels 50 in the non-display region under the light shield BM are the dummy pixels that are not used for image display. In the embodiment, the light shield BM is provided continuously to side surfaces (for example, a side surface 106) corresponding to the edges of the display part 95 at the outer side relative to the display region 100 in the display part 95 (see FIG. 15).

As illustrated in FIG. 12, the widths of the respective four sides of the non-display region 101 are not necessarily the same. To be specific, for example, as illustrated in FIG. 12, widths W2, W3, and W4 of three sides except for one side closer to the wires 110 are smaller than a width W1 of the one side at the side from which the wires 110 extend. When the plurality of display panels 2 are coupled, they are preferentially coupled at any of three sides except for the side closer to the wires 110, and thus the widths of the non-display regions 101 located between the respective display regions 100 of the display panels 2 can be made easier to be decreased.

Each display panel 2 has the configuration in which the polarizer 90 is provided on the display part 95 illustrated in FIG. 12. Provision of the polarizer 90 largely increases the thickness of the display panel 2 in comparison with that when only the display part 95 is provided. As a specific example, the thickness of the display part 95 in the embodiment is approximately 300 µm to 1000 µm. The thickness of the polarizer 90 is equal to or larger than 400 µm to 600 µm because the thickness of the polarization plate is approximately 400 µm. The polarizer 90 is an optical component, and thus it is difficult to reduce the thickness thereof.

Figure 13:
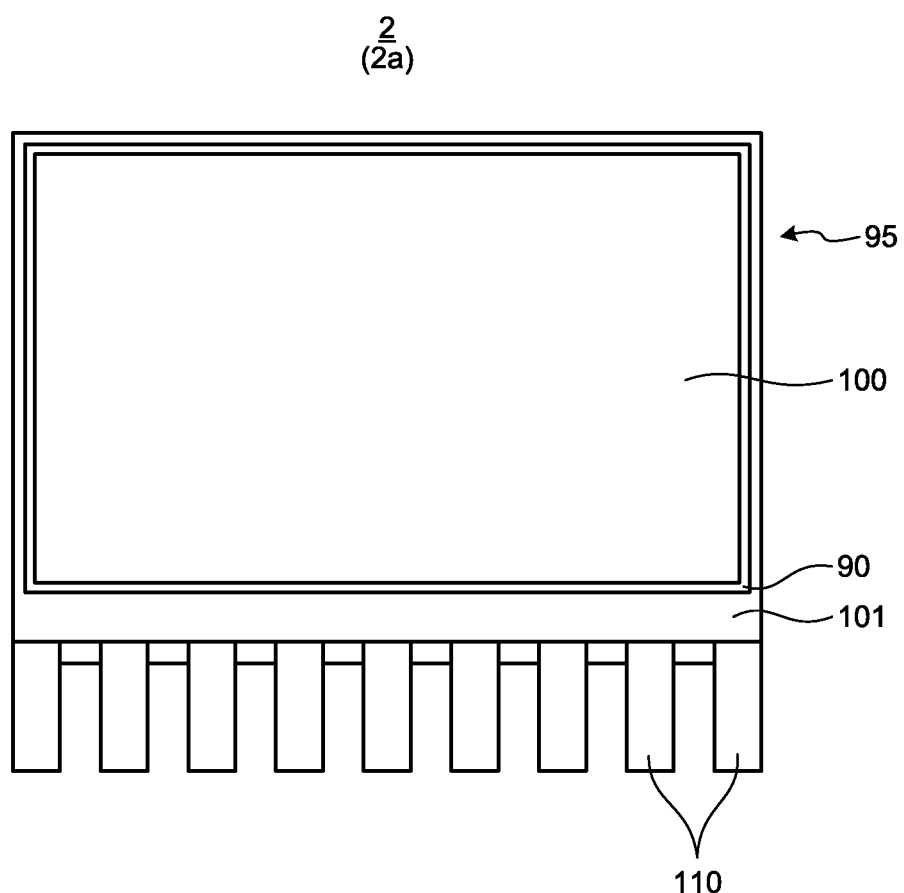
FIG. 13 is a view illustrating an example of a positional relation of the boundary between a display region and a non-display region and a polarizer.
Figure 14:
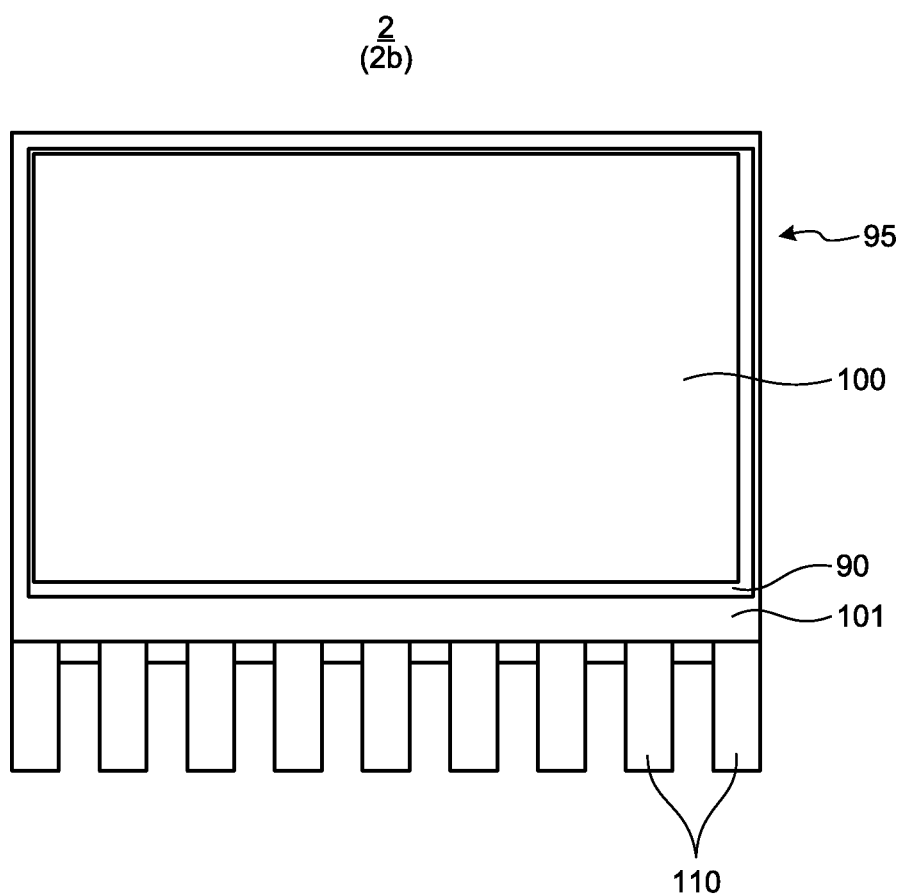
FIG. 14 is a view illustrating another example of the positional relation of the boundary between the display region and the non-display region and the polarizer.

FIG. 13 and FIG. 14 are views illustrating examples of a positional relation of the boundary between the display region 100 and the non-display region 101 and the polarizer 90. The polarizer 90 covers the display region 100 and a part thereof extends to the non-display region 101. To be specific, for example, as illustrated in FIG. 13, the longitudinal width and the lateral width of the rectangular polarizer 90 are slightly larger than the longitudinal width and the lateral width of the display region 100, respectively. The edges of the polarizer 90 provided so as to cover the display surface side of the display part 95 and the non-display region 101. As illustrated in FIG. 13, by providing the polarizer 90 with such a positional relation that the center of the display region 100 and the center of the polarizer 90 are substantially identical to each other, the widths of portions of the polarizer 90 that extend to each of the opposing two sides among the four sides of the non-display region 101 are substantially equal to each other.

The widths of the portions of the polarizer 90 that extend to the respective four sides of the non-display region 101 can be adjusted by adjusting the positional relation between the display region 100 and the polarizer 90. To be specific, for example, as illustrated in FIG. 14, when the boundary line between the display region 100 and the non-display region 101 and the edge of the polarizer 90 are made closer to each other on at least one side of the four sides of the rectangular shape, the width of the portion of the polarizer 90 that extends to the non-display region 101 on the one side can be made smaller. The positional relation between the display region 100 and the polarizer 90 is adjusted within a range satisfying the condition that the polarizer 90 covers the display region 100.

In the example illustrated in FIG. 14, the widths of the portions of the polarizer 90 that extend to the non-display region 101 at the left side and the upper side are made relatively smaller by arranging, at a lower right position, the polarizer 90 having the same longitudinal and lateral widths as those of the polarizer 90 illustrated in FIG. 13. This is an example of a specific method of further decreasing the width of the portion of the polarizer 90 that extends to at least a part of the non-display region 101. The method of decreasing the width of the portion of the polarizer 90 that extends to at least a part of the non-display region 101 is not limited thereto. For example, reduction in the difference between the longitudinal and lateral widths of the polarizer 90 and the longitudinal and lateral widths of the display region 100 can further decrease the widths of the portions of the polarizer 90 that extend to the non-display region 101.

Figure 15:
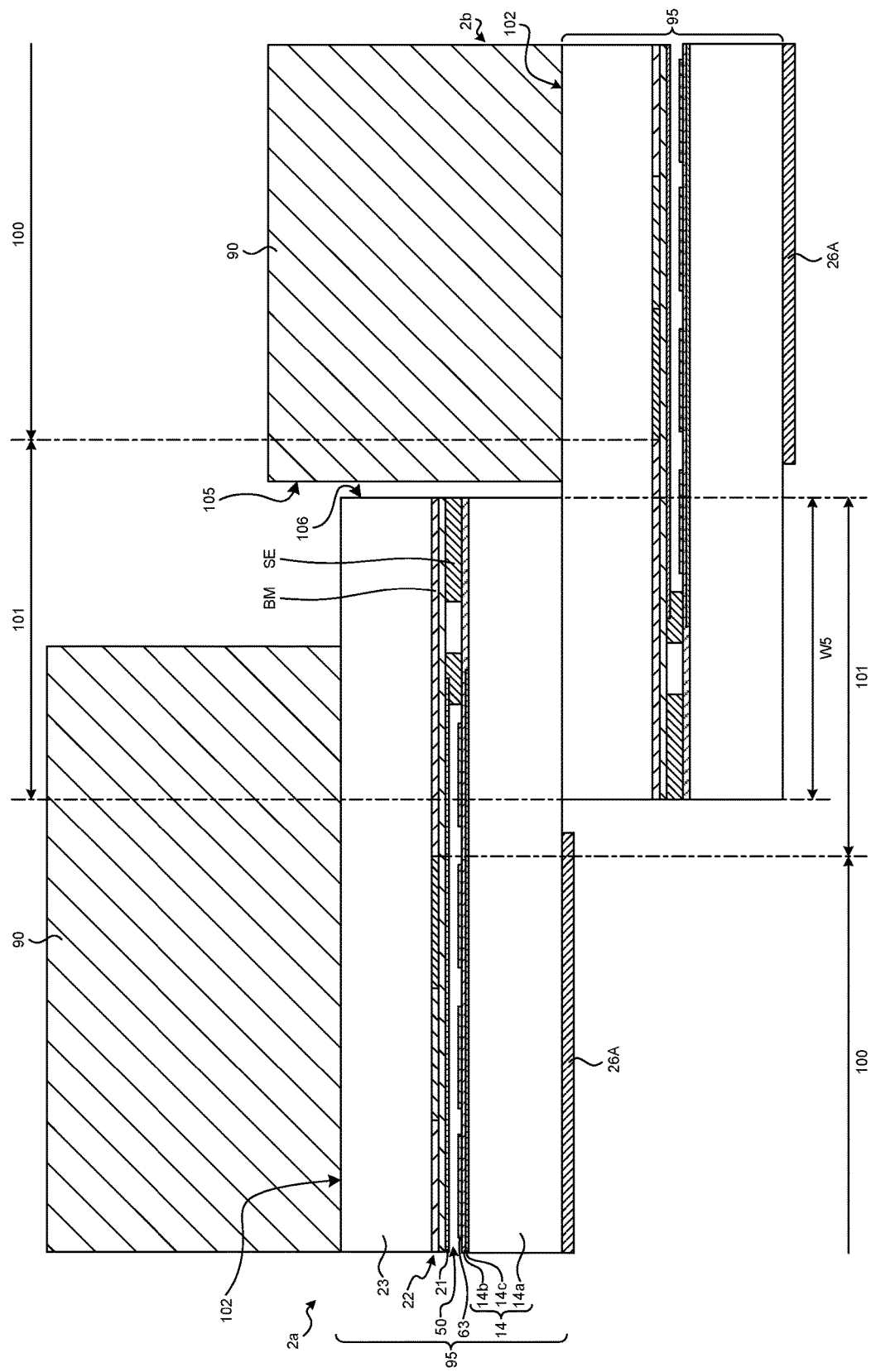
FIG. 15 is a schematic cross-sectional view illustrating an example of the coupling configuration of the display panels and the positional relations of the boundaries between the display regions and the non-display regions and the polarizers.
Figure 16:
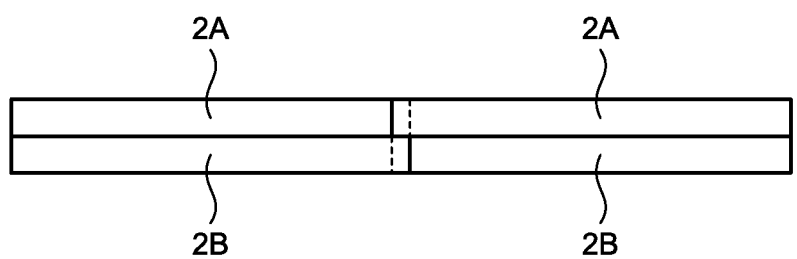
FIG. 16 is a schematic view illustrating a positional relation among the display panels illustrated in FIG. 1.

FIG. 15 is a schematic cross-sectional view illustrating an example of the coupling configuration of the display panels 2a and 2b and the positional relations of the boundaries between the display regions 100 and the non-display regions 101 and the polarizers 90. The cross-sectional views illustrated in FIG. 15 and the like are merely schematic and do not illustrate actual dimensions of the cross-sectional configuration devotedly. FIG. 16 is a schematic view illustrating a positional relation among the display panels 2a and 2b illustrated in FIG. 1. FIG. 16 illustrates the positional relation when seen from the direction of an arrow V1 where the upper side corresponds to the display surface side and the lower side corresponds to the rear surface side. A pair of display panels (for example, two display panels 2a and 2b) to be coupled to (for example, stacked on or mounted on) each other are arranged such that parts of the non-display regions 101 overlap with each other. The two display panels 2*a* and 2*b* to be coupled to each other are arranged such that one display panel 2*a* is located at the display surface side relative to the other display panel 2*b* and the other display panel 2*b* is located at the rear surface side relative to the one display panel 2*a*. To be specific, as illustrated in FIG. 15, the display panel 2*a* and the display panel 2*b* are coupled to each other so as to stack each other in a range (overlap range W5) having a predetermined width from the edges of the display parts 95. The non-display regions 101 are located in the overlap range W5. To be specific, the light shield BM is provided in the overlap range W5. In other words, the overlap range W5 does not include the display regions 100 having therein the pixels 50 for which the color filters 22 are provided.

A side surface (a side surface 105) that is closer to the display panel 2*a* at the display surface side (or a front-panel 2A, as needed) among side surfaces of the polarizer 90 of the display panel 2*b* at the rear surface side (or a rear-panel 2B, as needed) opposes a side surface (a side surface 106) that is closer to the rear-panel 2B among side surfaces of the front-panel 2A. That is to say, the polarizer 90 of the rear-panel 2B does not extend to a position overlapping with the front-panel 2A. To be specific, for example, as illustrated in FIG. 15, the polarizer 90 of the rear-panel 2B does not extend to the overlap range W5. The polarizer 90 of the rear-panel 2B illustrated in FIG. 15 is provided at a position at which it is necessarily present at the inner side relative to the boundary line between the display region 100 and the non-display region 101 on the display surface 102 along an X-Y plane, and thus the condition that the polarizer 90 of the rear-panel 2B covers the display region 100 is satisfied, and the polarizer 90 of the rear-panel 2B is provided at a position at which it does not extend to the overlap range W5.

To be more specific, the polarizer 90 of each display panel 2*b* is provided at a position in a direction away from a center portion of the display device 1 illustrated in FIG. 1 within a range satisfying the condition that the polarizer 90 covers the display region 100. As the position of the polarizer 90 is described with reference to FIG. 14, the polarizer 90 is located at the lower right position. This is because the front-panel 2A overlaps the non-display region 101 of the rear-panel 2B at positions corresponding to the upper and left two sides in FIG. 14. The above-mentioned arrangement of the polarizer 90 of the display panel 2*b* can further decrease the extension degree to the non-display region 101 side in which the light shield BM is provided.

In the embodiment, the front-panel 2A abuts against the rear-panel 2B. To be specific, the arrangement of the polarizer 90 of the display panel 2*b* as illustrated in FIG. 14 enables the two overlapping display parts 95 to abut against each other because the polarizer 90 is not located between the display parts 95. The thickness of the polarizer 90 of the rear-panel 2B is therefore not added to the thickness of the coupling portion between the display panel 2*a* and the display panel 2*b*. Accordingly, the thickness resulting from the configuration of the display panels 2 in the thickness of the display device 1 is the thickness provided by combining the thickness of the rear-panel 2B, the thickness of the front-panel 2A, and the thickness of polarizer 90 of the front-panel 2A.

In the embodiment, as for the pair of display panels 2 close to each other in the oblique direction intersecting with the two directions, both of the positions of the display panels 2 in the overlap direction are at the display surface side or the rear surface side relative to another pair of display panels 2 close to each other in the oblique direction. To be specific, the two display panels 2*a* and the two display panels 2*b* forming the four display panels illustrated in FIG. 1 are coupled in an arrangement of 2×2 while the longitudinal direction is along the X direction and the lateral direction is along the Y direction. The two directions indicate the X direction and the Y direction. That is to say, the pairs of display panels 2 close to each other in the oblique directions intersecting with the two directions indicate the pair of display panels as a combination of the upper right display panel 2*a* and the lower left display panel 2*a* illustrated in FIG. 1 and the pair of display panels as a combination of the upper left display panel 2*b* and the lower right display panel 2*b*. Both of the upper right display panel 2*a* and the lower left display panel 2*a* are located at the display surface side relative to the upper left display panel 2*b* and the lower right display panel 2*b*. Both of the upper left display panel 2*b* and the lower right display panel 2*b* are located at the rear surface side relative to the upper right display panel 2*a* and the lower left display panel 2*a*.

In the embodiment, for example, as illustrated in FIG. 15, the polarizer 90 of front-panel 2A may extend to the non-display region 101 at a position overlapping with the rear-panel 2B.

The configuration in which the polarizers 90 of all the display panels 2 included in the display device 1 do not extend to parts of the non-display regions 101 overlapping with other display panels 2 may be employed. To be specific, for example, when all the display panels 2 included in the display device 1 in the embodiment are configured as the display panels 2 in which the polarizers 90 are provided with the same arrangement as that of the rear-panel 2B, the configuration in which the polarizers 90 of all the display panels 2 included in the display device 1 do not extend to parts of the non-display regions 101 overlapping with the other display panels 2 can be provided. In this case, arrangement of the polarizers 90 of the four display panels 2 included in the display device 1 can be made uniform. This can eliminate the necessity to distinguish the display panels 2*a* and the display panels 2*b* from each other, thereby further simplifying operations involved in manufacturing of the display panels 2 included in the display device 1.

Figure 17:
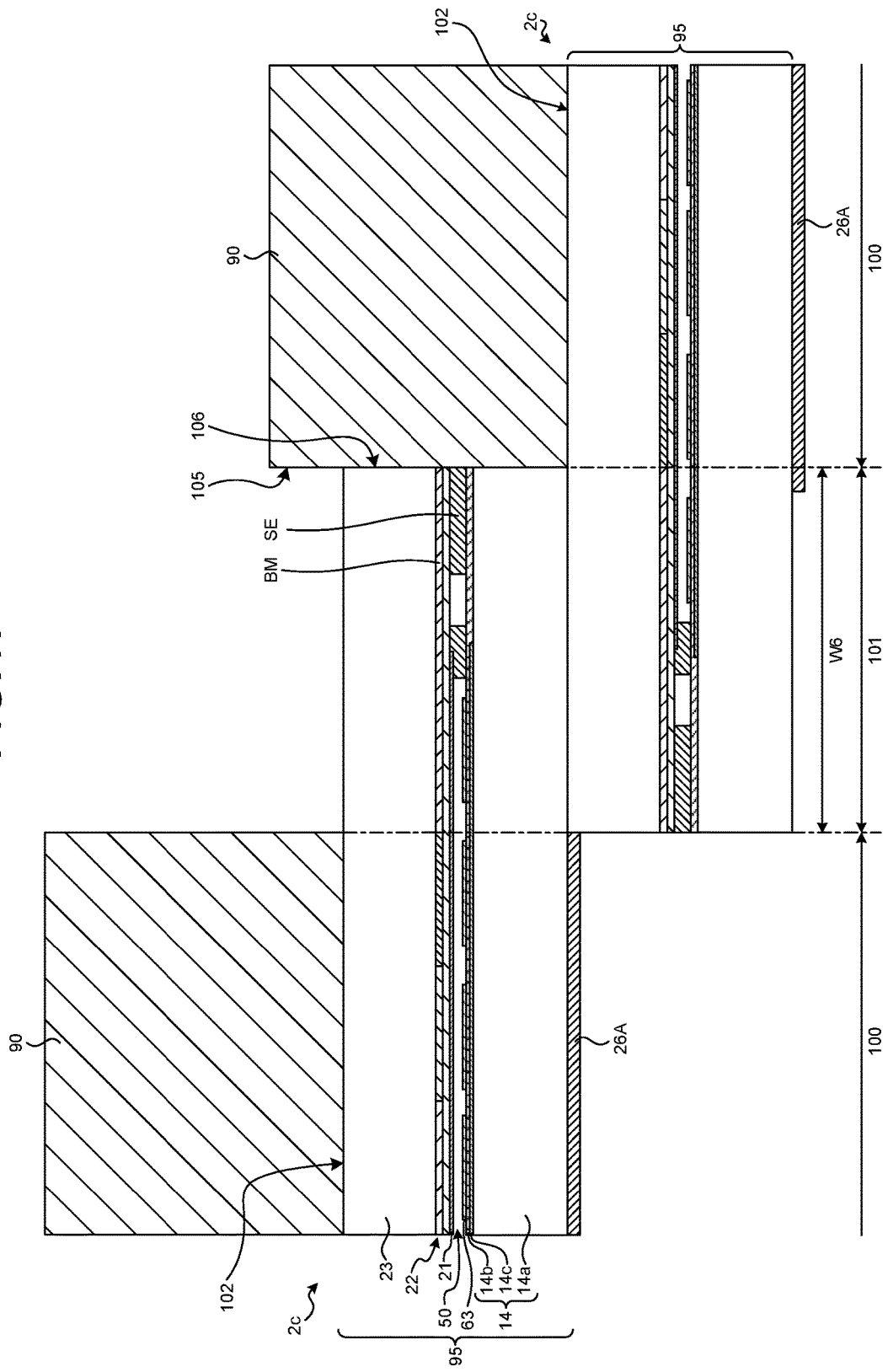
FIG. 17 is a schematic cross-sectional view illustrating another example of the coupling configuration of display panels and the positional relations of the boundaries between the display regions and the non-display regions and the polarizers.

FIG. 17 is a schematic cross-sectional view illustrating another example of the coupling configuration of the display panels 2*c* and the positional relations of the boundaries between the display regions 100 and the non-display regions 101 and the polarizers 90.

FIG. 17 illustrates an example of the configuration in which the polarizers 90 of all the display panels 2*c* do not extend to the non-display regions 101 at positions overlapping with other display panels 2*c*. In the example illustrated in FIG. 17, when seen from the display surface side, the side surface 106 that is closer to the display panel 2*c* at the rear surface side among the side surfaces of the polarizer 90 of the display panel 2*c* is located on the boundary between the display region 100 and the non-display region 101. In other words, the polarizer 90 of each display panel 2*c* covers the display region 100 and parts of the polarizer 90 extend to the non-display region 101 at positions except for the non-display region 101 at the positions overlapping with the other display panels 2*c* when a plurality of display panels 2*c* are coupled.

As illustrated in FIG. 17, the polarizer 90 of each display panel 2*c* does not extend to parts of the non-display region 101 overlapping with the other display panels 2*c* when the plurality of display panels 2*c* are coupled. This can further ensure a large overlap range W6 in which the display panels 2*c* overlap with each other, thereby making it equal to the width of one side (any of the widths W1 to W4) of the non-display region 101 at maximum. That is to say, maximization of the overlap degree of the non-display regions 101 in coupling of the display panels 2c can minimize the width of the non-display regions 101 (to be the width equal to the width of one side of the non-display region 101) located between the respective display regions 100 of the display panels 2c when seen from the display surface side. When the overlap degree is thus maximized in the embodiment, the side surface that is closer to the display panel 2c side at the rear surface side among the side surfaces of the display panel 2c at the display surface side is located on the boundary between the display region 100 and the non-display region 101 of the display panel 2c at the rear surface side.

As illustrated in the examples of FIG. 15, FIG. 17, and the like, each display panel 2 in the embodiment includes a polarization plate 26A provided at the rear surface side. The polarization plate 26A is, for example, the same as the polarization plate of the polarizer 90. The thickness of the polarization plate 26A illustrated in FIG. 15 and the like is not the actual thickness of the polarization plate 26A and are merely schematically illustrated for representing arrangement of the polarization plate 26A. When the polarization plate 26A is provided at the rear surface side, the degrees of extension or contraction of the polarization plates 26 and 26A that can be generated in accordance with changes in environmental conditions such as temperature change can be made more approximate between the display surface side and the rear surface side of the display part 95. That is to say, the degree of extension or contraction of the polarization plate 26 included in the polarizer 90 at the display surface 102 side of the display part 95 and the degree of extension or contraction of the polarization plate 26A at the rear surface side are made approximate to each other, thereby reducing the possibility that the display panel 2 is warped with the extension or the like of the polarization plate 26.

Figure 18:
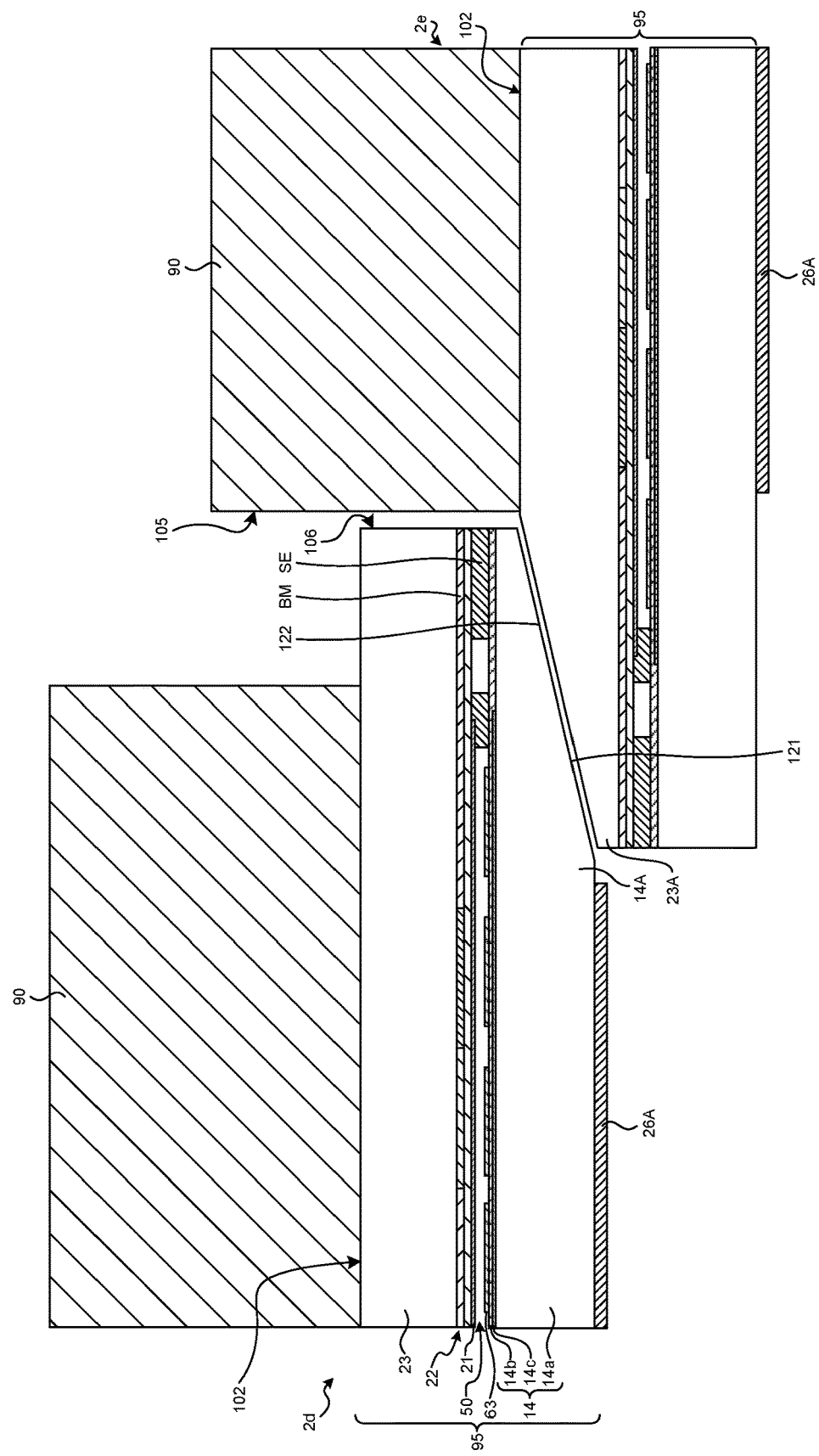
FIG. 18 is a schematic cross-sectional view illustrating an example of the coupling configuration of display panels on which thin portions are provided.

FIG. 18 is a schematic cross-sectional view illustrating an example of the coupling configuration of the display panels 2d and 2e on which thin portions 121 and 122 are provided, respectively. At least one of the display panels 2d and 2e that overlap with each other may have a thin portion(s) (for example, the thin portion(s) 121 and/or 122) processed to make the thickness in the overlap direction at an abutting position at which they abut against each other with the overlap smaller than the thickness at other positions. When the thin portion 121 is provided on the display panel 2d located at the display surface side, it is provided at the rear surface side on the display panel 2d. When the thin portion 122 is provided on the display panel 2e located at the rear surface side, it is provided at the display surface side on the display panel 2e.

To be specific, when both of the two display panels 2d and 2e that overlap with each other have the thin portions 121 and 122, respectively, for example, as illustrated in FIG. 18, the display panel 2d at the display surface side has the thin portion 121 on the lower surface side of a circuit substrate 14A and the thin portion 121 is inclined to the display surface side from the rear surface side. The display panel 2e at the rear surface side has the thin portion 122 on the upper surface side of a second substrate 23A and the thin portion 122 is inclined to the rear surface side from the display surface side. A range in which the thin portions 121 and 122 are provided is a what-is-called overlap range (for example, the overlap range W5 in FIG. 15 or the overlap range W6 in FIG. 17). In the case of the example illustrated in FIG. 18, the thin portions 121 and 122 are provided such that the display surface 102 of the display panel 2d and the display surface 102 of the display panel 2e are parallel with each other when the display panels 2d and 2e overlap with each other. Although a gap is illustrated between the thin portion 121 and the thin portion 122 in FIG. 18, the gap is schematic and is not essential. The gap may be filled with an adhesive, for example, or may be closed with abutment between the display panels 2d and 2e.

It is sufficient that at least one of the two overlapping display panels 2 has the thin portion(s). For example, the thin portion may be provided so as to reduce the thickness of the circuit substrate 14a of the display panel 2 at the display surface side toward the display surface side from the rear surface side in accordance with the shape of the second substrate 23 with no thin portion at the display surface side. Alternatively, the thin portion may be provided so as to reduce the thickness of the second substrate 23 of the display panel 2 at the rear surface side toward the rear surface side from the display surface side in accordance with the shape of the circuit substrate 14a with no thin portion at the rear surface side.

Figure 19:
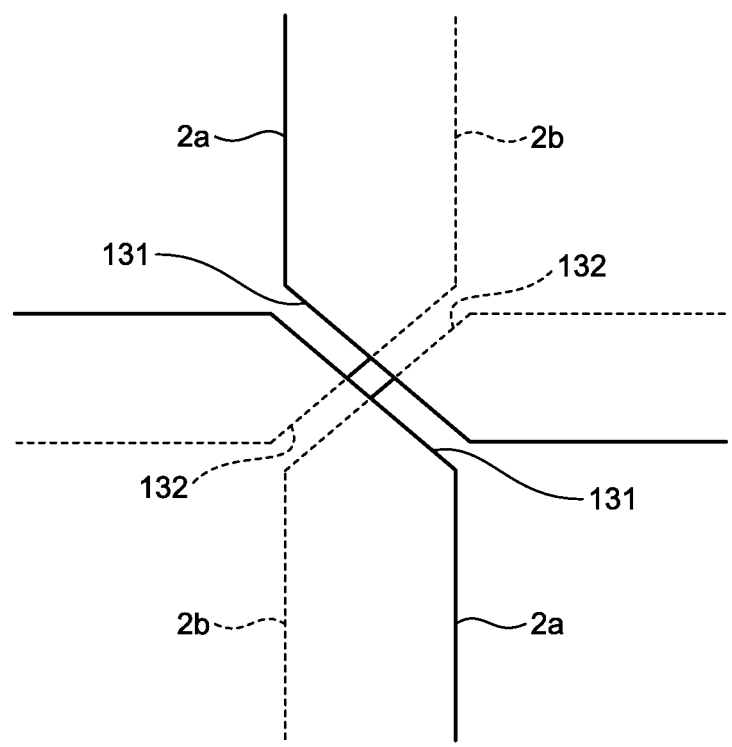
FIG. 19 is an enlarged view illustrating the schematic configuration of corner portions of the display panels in the vicinity of the center of a coupled display region.

Next, corner portions of the display panels 2 that are coupled will be described. FIG. 19 is an enlarged view illustrating the schematic configuration of corner portions of the display panels 2a and 2b in the vicinity of the center of the coupled display region. The corner portions of the rectangular display panels 2a and 2b that are close to the other display panels 2a and 2b in the oblique directions intersecting with the two directions are cut. The cut enables the display panels 2a and the display panels 2b with the positional relations in the oblique directions to be closer to each other.

To be specific, for example, as illustrated in FIG. 19, each display panel 2a has a cut portion 131 having such a shape that one corner portion thereof close to the other display panel 2a in the oblique direction among the corner portions (see FIG. 12 and FIG. 13) of the rectangular shape before being cut is cut off. Each display panel 2b has a cut portion 132 having such a shape that one corner portion thereof close to the other display panel 2b in the oblique direction among the corner portions (see FIG. 12 and FIG. 14) of the rectangular shape before being cut is cut off. In the case of the example illustrated in FIG. 19, by the four display panels 2 (the two display panels 2a and the two display panels 2b) being coupled, the cut portions 131 of the two display panels 2a close to each other in the oblique direction are parallel with each other. Furthermore, the cut portions 132 of the two display panels 2b close to each other in the oblique direction are parallel with each other. Although gaps are formed between the two display panels 2a close to each other in the oblique direction and between the two display panels 2b close to each other in the oblique direction in FIG. 19, the two display panels 2a and the two display panels 2b may abut against each other in the oblique directions so as to close the gaps.

Figure 20:
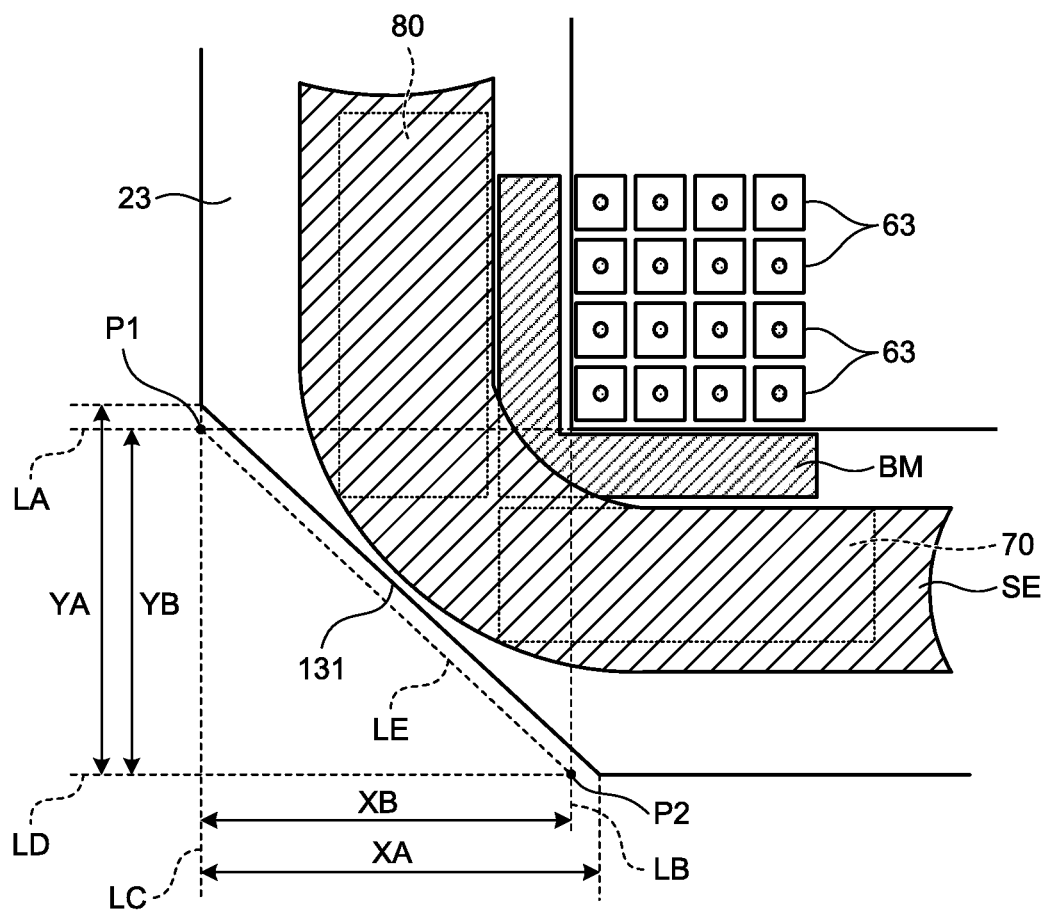
FIG. 20 is a descriptive view for explaining an example of a positional relation of boundary lines between the display region and the non-display region and a cut portion in the corner portion.

FIG. 20 is a descriptive view for explaining an example of a positional relation of boundary lines between the display region 100 and the non-display region 101 and the cut portion in the corner portion. Each cut corner portion has a shape formed by cutting at least a portion at the outer side relative to a straight line connecting two intersections of two straight lines (for example, straight lines LA and LB) provided by extending two boundary lines closer to the corner portion among the boundary lines between the rectangular display region 100 and the frame-like non-display region 101 surrounding the display region 100 and two straight lines (for example, straight lines LC and LD) in the directions tracing the two sides of the display panel 2a that are in contact with the corner portion.

To be specific, for example, as illustrated in FIG. 20, the intersection of the straight line LA provided by extending the boundary line along the X direction in the above-mentioned two boundary lines between the display region 100 and the non-display region 101 and the straight line LC in the direction tracing the side along the Y direction in the above-mentioned two sides in contact with the one corner portion close to the other display panel 2a in the oblique direction is assumed to be a point P1. The intersection of the straight line LB provided by extending the boundary line along the Y direction in the above-mentioned two boundary lines between the display region 100 and the non-display region 101 and the straight line LD in the direction tracing the side along the X direction in the above-mentioned two sides in contact with one corner portion close to the other display panel 2a in the oblique direction is assumed to be a point P2. As illustrated in FIG. 20, the cut portion 131 is cut at a position at the display region 100 side relative to a straight line LE connecting the point P1 and the point P2. With this, the display regions 100 can be made closer in the two orthogonal directions (the X direction and the Y direction).

In particular, by arranging the polarizers 90 of the display panels 2b in the same manner as those of the two display panels 2c in FIG. 17, the distance between the display regions 100 can be made equal to the width of one side of the non-display region 101 when the two display panels 2b close to each other in the oblique direction are made closest to each other. For example, the distance between the display regions 100 of the two display panels 2a and 2b in the longitudinal direction illustrated in FIG. 1 can be made equal to the width W2 (see FIG. 12).

In the embodiment, the cut amount (XA and YA) in the cut portion 131 in which the corner is cut along the straight line that is substantially parallel with the straight line LE is larger than the cut amount (XB and YB) when the corner is cut along the straight line LE connecting the point P1 and the point P2. It is sufficient that the cut amount in the cut portion 131 is equal to or larger than the cut amount when the corner is cut along the straight line LE connecting the point P1 and the point P2.

Although the cut portion 131 of the display panel 2a is used as an example in the description with reference to FIG. 20, the same can be said to the cut portions 132 of the display panels 2b and cut portions 133, which will be described later. Corner portions of other display panels (for example, the display panels 2c, 2d, 2e, $2a_1$ to $2a_9$, and $2b_1$ to $2b_9$) included in the display device 1 can be cut in the same manner.

The shapes of the cut portions 131 to 133 when seen from the display surface side are not limited to the shapes drawing the straight lines. The cut portions 131 to 133 may have curved shapes such as round shapes on a part or all thereof.

Next, the configuration provided on the display device 1 at the display surface side will be described. The display device 1 includes a transparent cover 140 covering at least a part of the coupled display region at the display surface side such that the display surface in the coupled display region is made flat.

Figure 21:
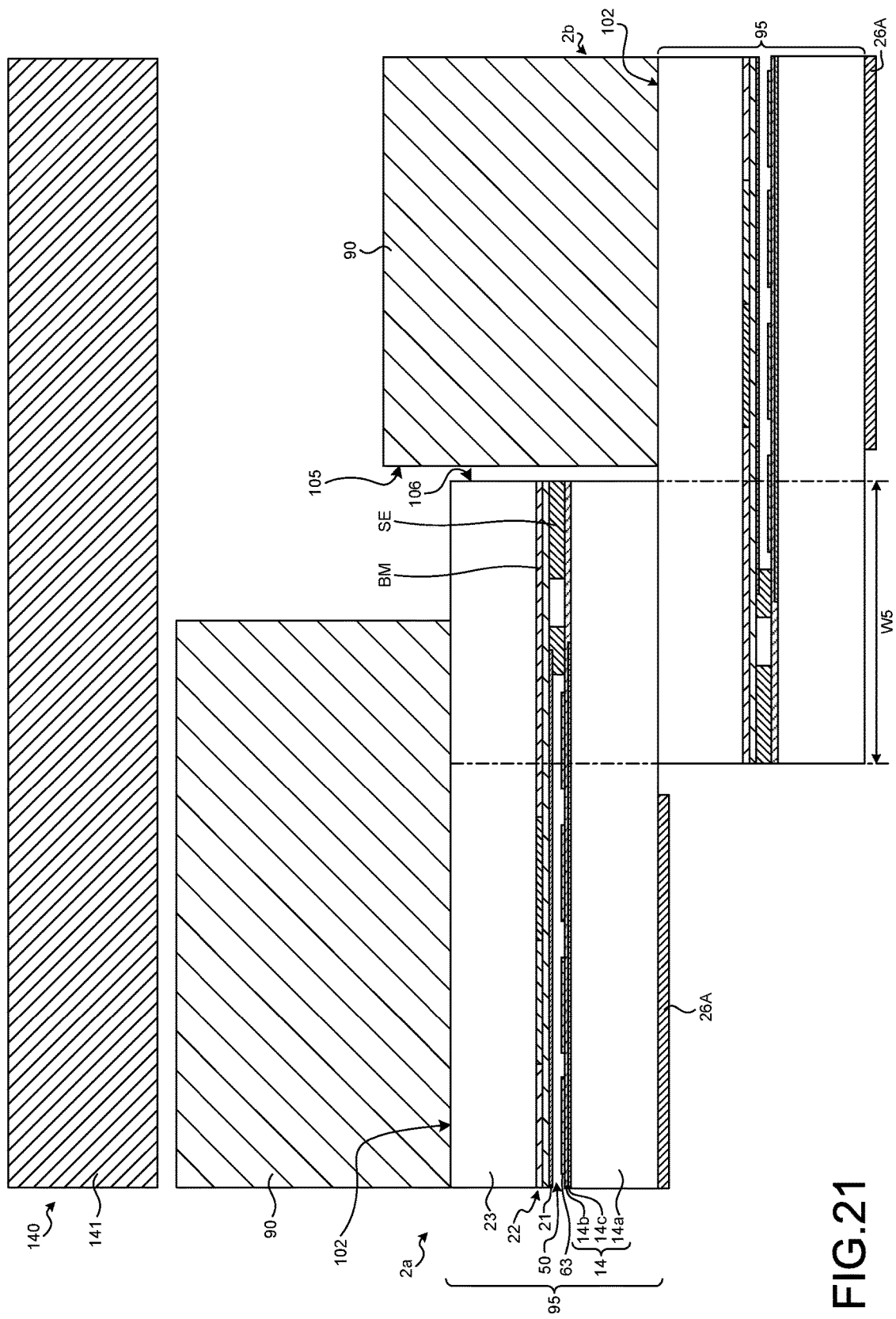
FIG. 21 is a view illustrating an example of the configuration of a cover.
Figure 22:
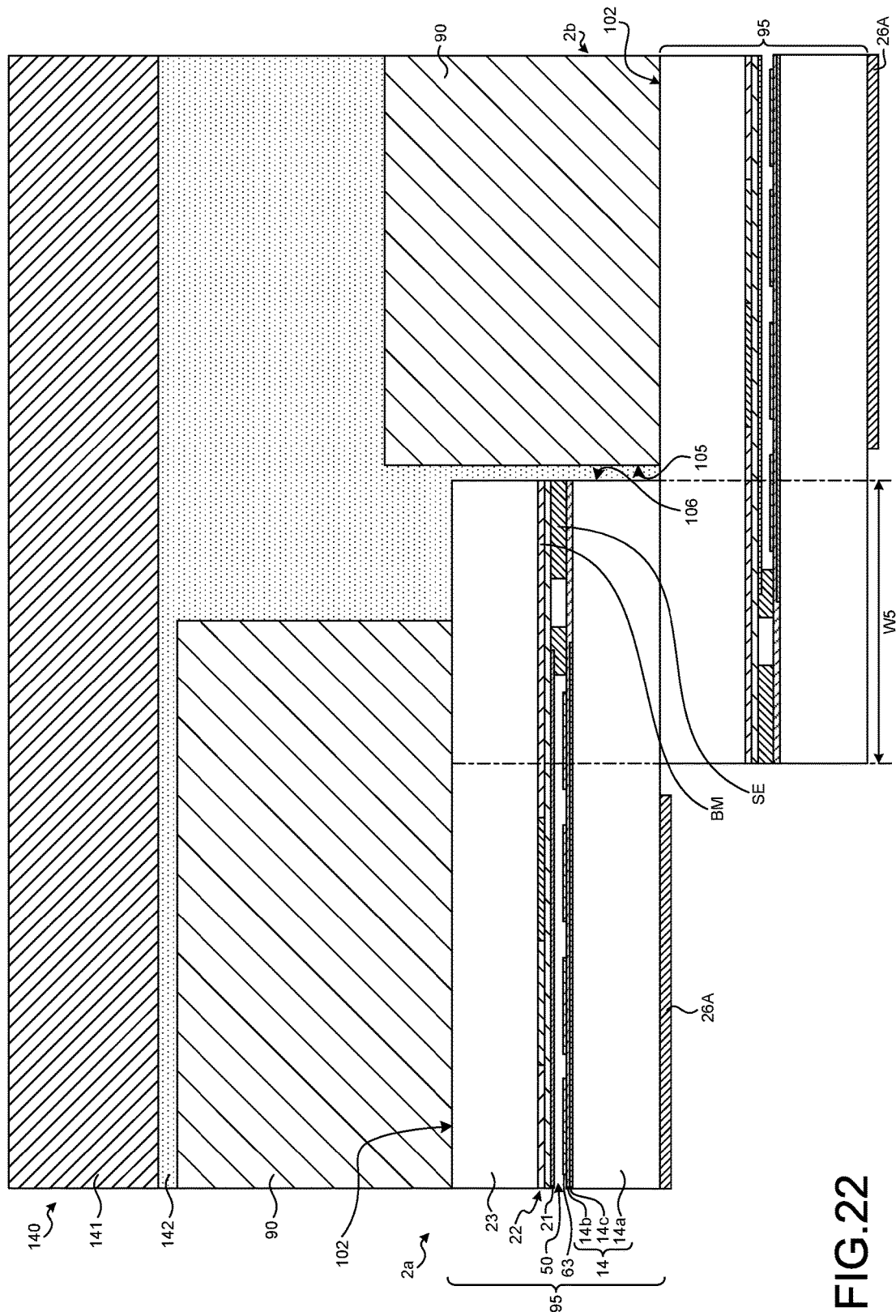
FIG. 22 is a view illustrating another example of the configuration of the cover.
Figure 23:
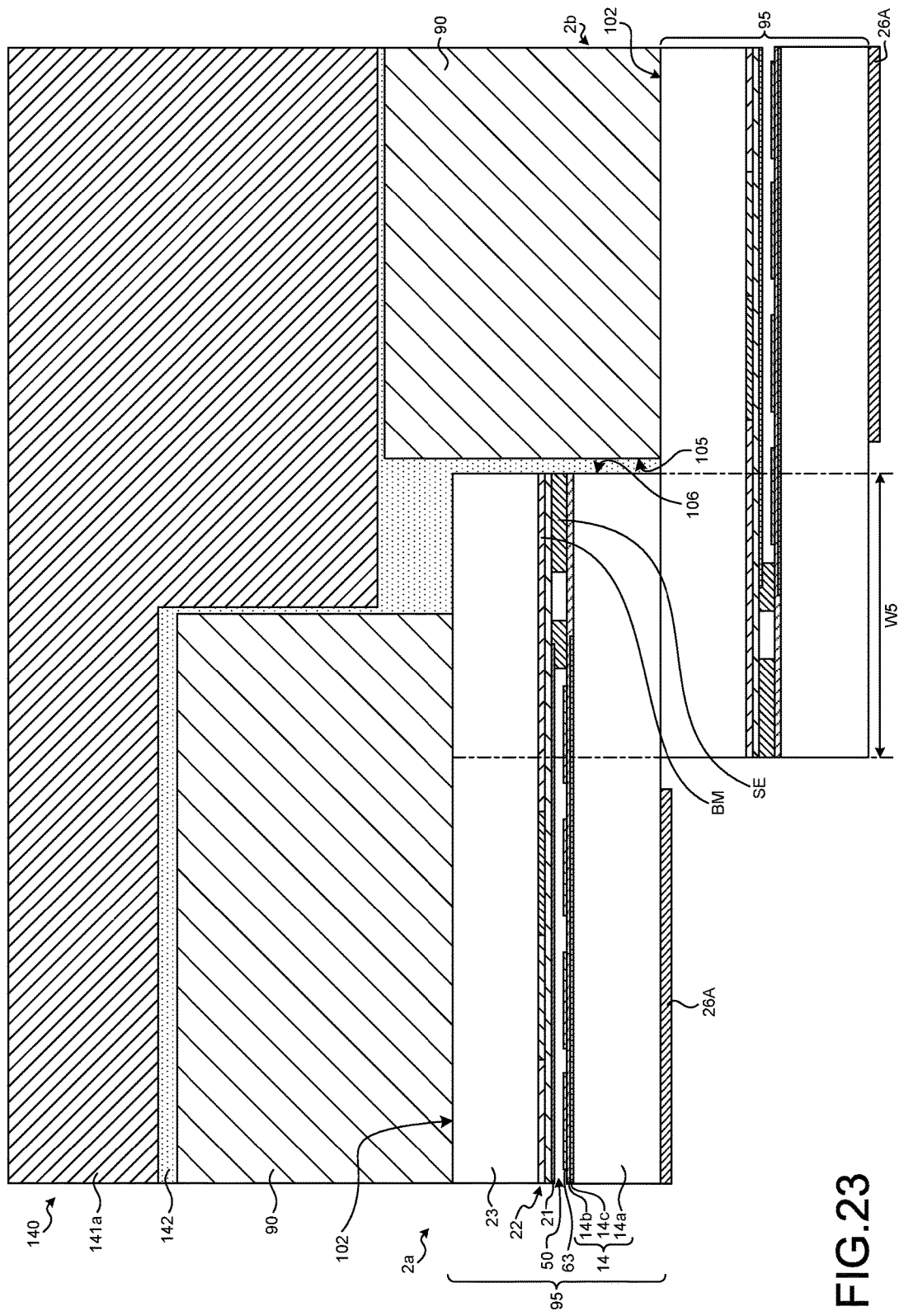
FIG. 23 is a view illustrating still another example of the configuration of the cover.
Figure 24:
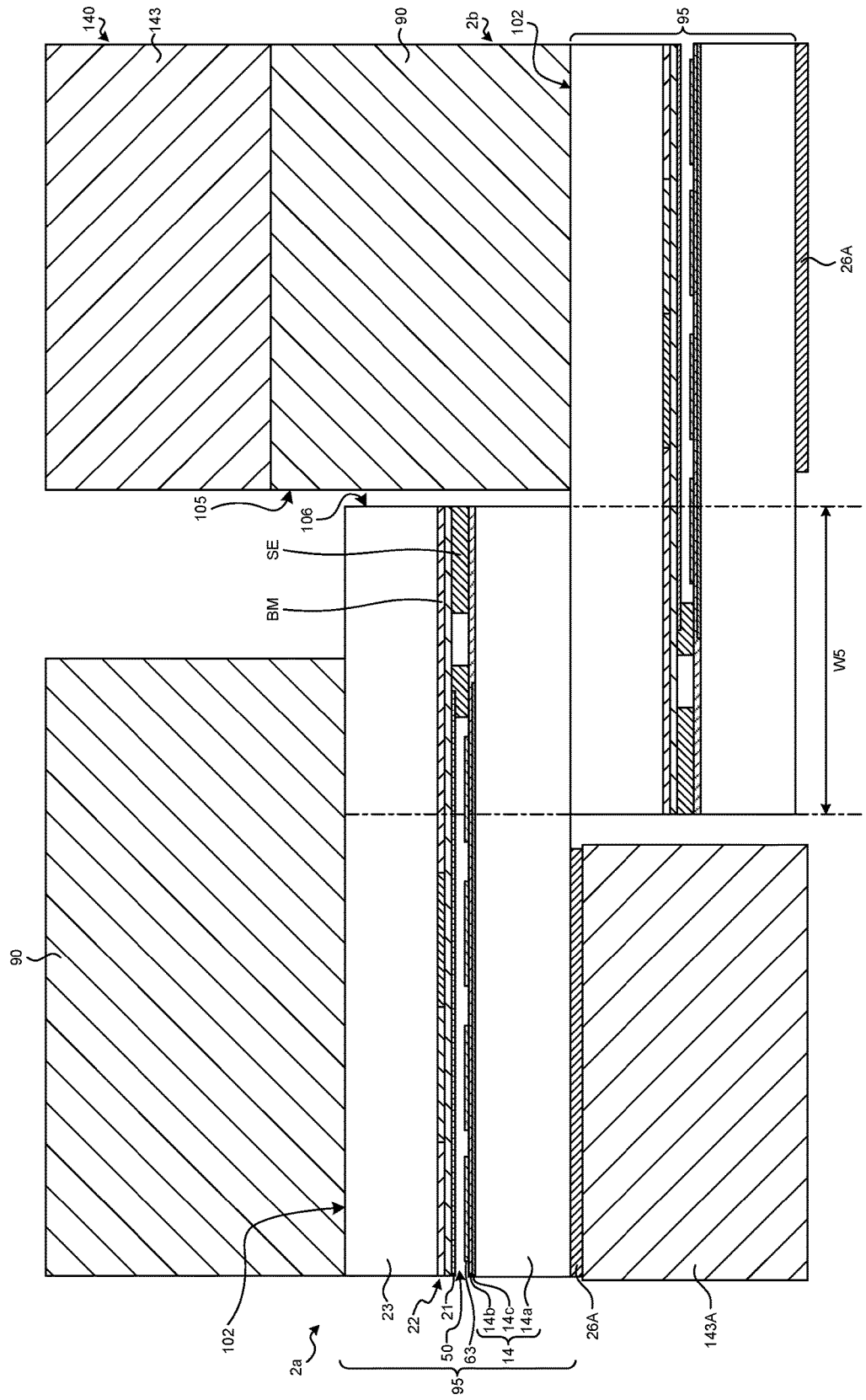
FIG. 24 is a view illustrating an example of the configuration including a film.
Figure 25:
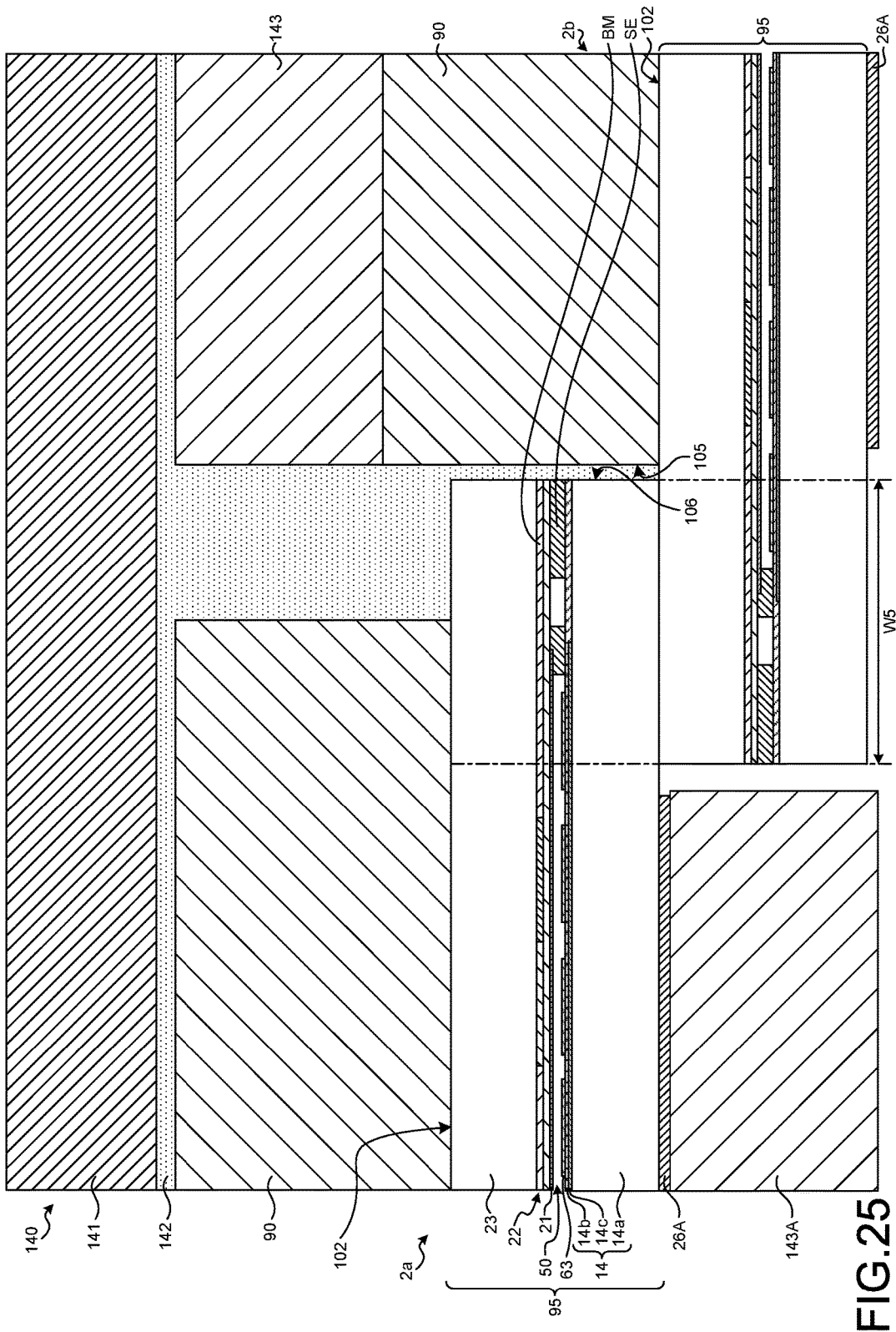
FIG. 25 is a view illustrating another example of the configuration including the film.

FIG. 21, FIG. 22, and FIG. 23 are views illustrating examples of the configuration of the cover 140. FIG. 24 and FIG. 25 are views illustrating examples of a configuration including a film 143. As illustrated in FIG. 21, FIG. 22, and FIG. 25, the cover 140 may include a cover member 141 covering all of the plurality of coupled display panels 2a and 2b at the display surface side. To be specific, the cover member 141 is a member that is flat at least at the display surface side and is formed with resin such as plastic as a main material. As illustrated in FIG. 21, FIG. 22, and FIG. 25, the coupled display region of the display device 1 at the display surface side can be made flat with a simple configuration by providing the plate-like cover member 141. With this, the light traveling directions (reflection direction, scattering direction, and the like) at the display surface side can be made uniform more easily on the entire coupled display region.

As illustrated in FIG. 23, the shape of a cover member 141a at the side of the display panels 2a and 2b may be a step shape corresponding to the steps between the polarizers 90 of the display panels 2a and 2b that are generated by the overlap of the non-display regions 101. With this, gaps between the cover member 141a and the rear-panels 2B at the farther positions from the cover member 141a can be made smaller. In addition, the positional relation (the display surface side, the rear surface side, and the like) of the plurality of display panels 2a and 2b can be specified more easily by arranging the display panels 2a and 2b so as to fit the steps of the cover member 141a.

As illustrated in FIG. 22, FIG. 23, and FIG. 25, the cover 140 may have a filler 142 that fills the gaps between the cover member 141 or 141a and the display panels 2a and 2b. The filler 142 is, for example, transparent resin having viscosity at the time of filling and is hardened by hardening processing such as irradiation with ultraviolet lays. The gaps between the cover member 141 or 141a and the display panels 2a and 2b are filled with the filler 142, and thus the traveling directions of light passing through the cover member 141 or 141a are made easier to be uniform.

As illustrated in FIG. 24 and FIG. 25, the display device 1 may include the film 143 located at the display surface side of the polarizers 90 provided on the rear-panels 2B. In this case, the thickness of the film 143 corresponds to the steps between the polarizers 90 provided on the rear-panels 2B and the polarizers 90 provided on the front-panels 2A. To be specific, for example, as illustrated in FIG. 24 and FIG. 25, the film 143 may be stretched at the display surface side of the polarizers 90 of the rear-panels 2B. In this case, the height of the film 143 at the display surface side based on the display surfaces 102 of the rear-panels 2B are the same as the height of the polarizers 90 provided on the front-panels 2A overlapping with the rear-panels 2B. The film 143 is a film-like member formed with resin such as poly-ethylene terephthalate (PET) as a main material. This can further moderate the steps between the coupled display panels 2a and 2b at the display surface side.

As illustrated in FIG. 24 and FIG. 25, the film 143 may be provided at the rear surface side of the front-panels 2A. This can further moderate steps at the rear surface side.

Hereinbefore, the cover 140 has been described using the configuration in which the display panels 2a and 2b are coupled as an example. The cover 140 can be also provided in the display device 1 configured by other display panels (for example, the display panels 2c, 2d, 2e, $2a_1$ to $2a_9$, and $2b_1$ to $2b_9$) in the same manner.

Figure 26:
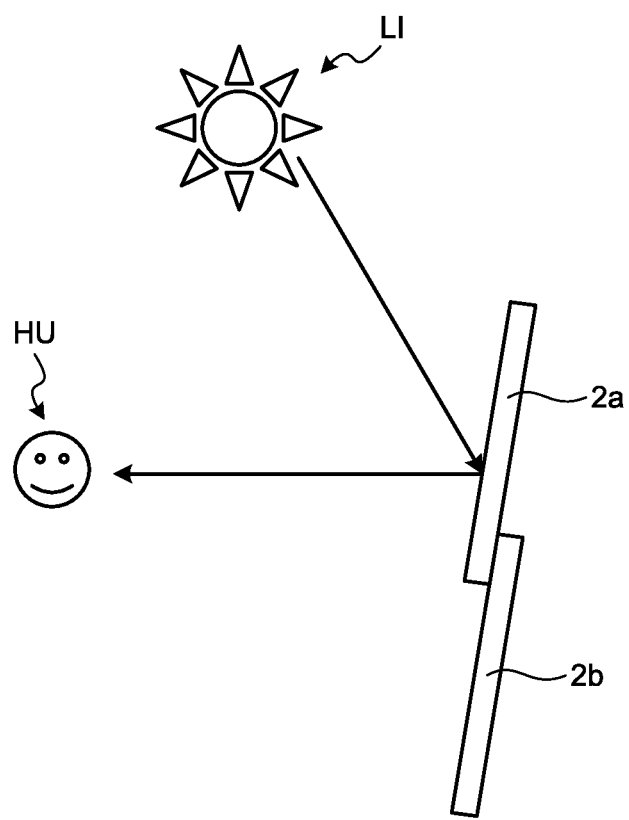
FIG. 26 is a schematic view illustrating an example of a panel installation angle based on the incident direction of light from a light source and a viewer.

Next, an angle of the display panels 2 when the display device 1 is installed will be described. FIG. 26 is a schematic view illustrating an example of a panel installation angle based on the incident direction of light from a light source LI and a viewer HU. The angle of the display panels 2 is preferably an angle determined based on the incident direction of the light from the light source LI of the display panels 2 and the positional relation between the display device 1 and the viewer HU viewing an image displayed on the coupled display region. To be specific, the angle is preferably set to an angle enabling the display panels 2 to guide the light from the light source LI to the viewer HU more successfully. The angle is an angle at which the light from the light source LI is guided to the viewer HU, for example, when specular reflection of the light is supposed to occur.

Figure 27:
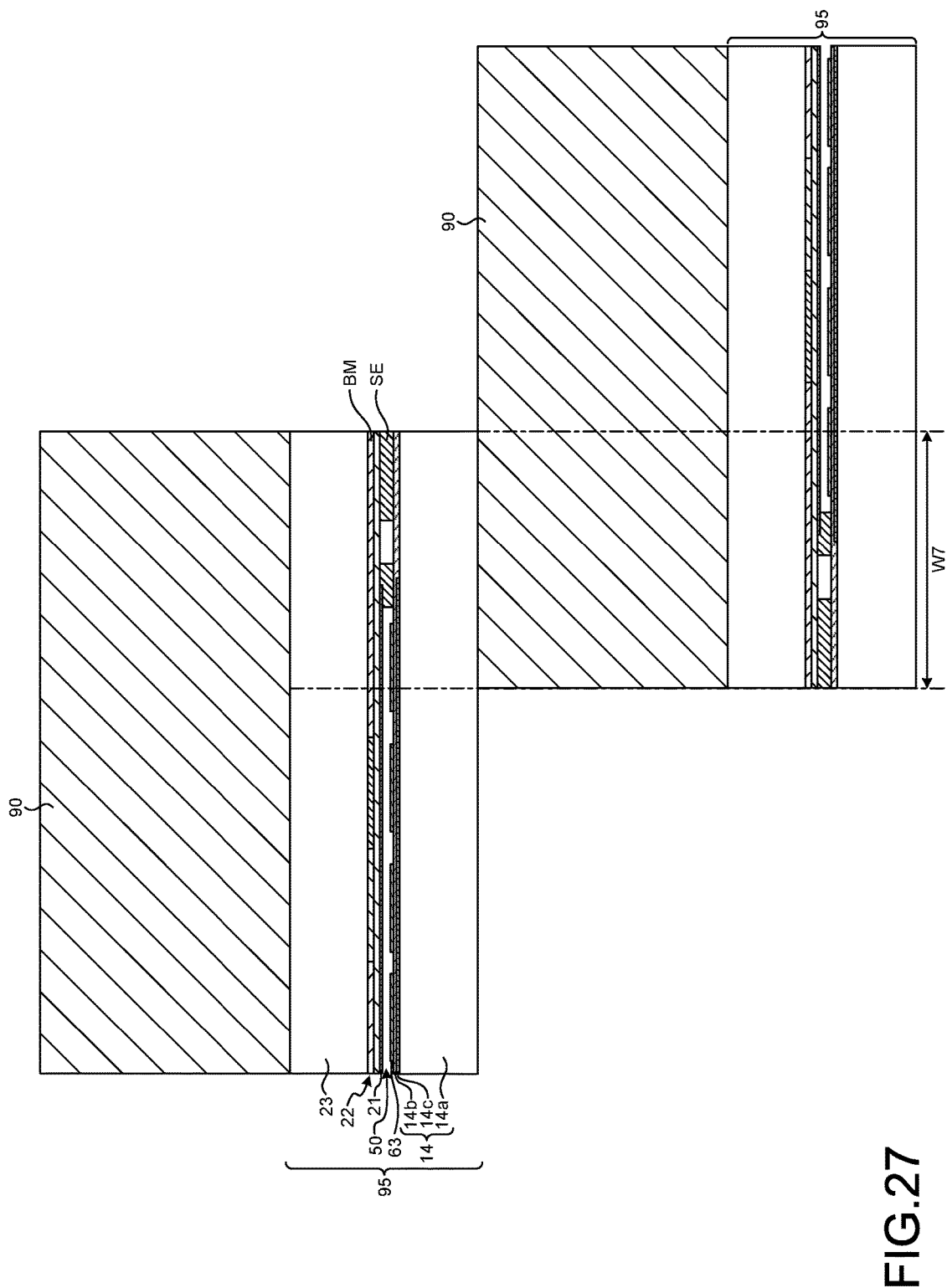
FIG. 27 is a view of a comparative example illustrating the case in which non-display regions of the display panels provided with the polarizers simply overlap with each other.

FIG. 27 is a view of a comparative example illustrating the case in which the non-display regions 101 of display panels provided with the polarizers 90 simply overlap with each other. When the conventional display panels are superimposed on each other such that parts of the non-display regions 101 overlap with each other, as illustrated in FIG. 27, the polarizer 90 provided on the display part 95 at the rear surface side is located in an overlap range W7 in which the display part 95 at the display surface side and the display part 95 at the rear surface side overlap with each other. That is to say, the polarizer 90 provided on the rear-panel increases the step between the display surface side of the front-panel and the display surface side of the rear-panel. In the conventional configuration, it is difficult to reduce the possibility of the step being viewed because the step is easier to be viewed as the step becomes larger.

By contrast, according to the embodiment, the side surface (the side surface 105) that is closer to the front-panel 2A side among the side surfaces of the polarizer 90 of the rear-panel 2B opposes the side surface (the side surface 106) that is closer to the rear-panel 2B side among the side surfaces of the front-panel 2A. That is to say, the polarizer 90 of the rear-panel 2B does not extend to a position overlapping with the front-panel 2A. This enables the two display panels 2a and 2b to overlap with each other without adding the thickness of the polarizer 90 of the rear-panel 2B in the overlap direction of the two display panels 2a and 2b along which parts of the non-display regions 101 overlap with each other. Accordingly, the step between the display surface 102 of the front-panel 2A and the display surface 102 of the rear-panel 2B can be made smaller. The step generated between the plurality of display regions 100 can therefore be made more difficult to be viewed even when the configurations including the polarization plates 26 are provided on the display surfaces 102.

Because the polarizers 90 of all the display panels 2 (for example, the display panels 2c) included in the display device 1 do not extend to the non-display regions 101 at the positions overlapping with the other display panels 2, arrangement of the polarizers 90 of all the display panels 2 included in the display device 1 can be made uniform. This can eliminate the necessity to distinguish the front-panels 2A and the rear-panels 2B from each other, thereby further simplifying operations involved in the manufacturing of the display panels 2 included in the display device 1.

Because the polarizers 90 of the front-panels 2A extend to the non-display regions 101 at the positions overlapping with the rear-panels 2B, accuracy required for adjusting the positional relation between the polarizers 90 and the display regions 100 of the front-panels 2A can be moderated. This can further facilitate the manufacturing of the front-panels 2A.

Moreover, because the display panels 2a at the display surface side abut against the display panels 2b at the rear surface side, the steps between the display parts 95 at the display surface side and the display parts 95 at the rear surface side can be made smaller.

Because at least one of the two display panels 2 (for example, the display panels 2d and 2e) has the thin portion(s) (for example, the thin portion(s) 121 and/or 122), the step between the display surface side of the display panel 2d located at the display surface side and the display surface side of the display panel 2e located at the rear surface side can be made smaller.

The side surfaces 106 of the display panels 2c at the display surface side are located on the boundaries between the display regions 100 and the non-display regions 101 of the display panels 2c at the rear surface side, thereby further decreasing the widths of the non-display regions 101 located between the display regions 100 of the display panels 2c when seen from the display surface side. This can make the non-display regions 101 located in the coupled display region more difficult to be viewed.

The angle of the display panels 2 is determined based on the incident direction of the light from the light source LI of the display panels 2 and the positional relation between the display device 1 and the viewer HU viewing an image displayed on the coupled display region, thereby enabling the display panels 2 to successfully guide the light from the light source LI to the viewer HU.

In the display device 1 having the coupled display region in which the four rectangular display panels 2 (for example, the display panels 2a and 2b) are coupled two by two along the two orthogonal directions, the corner portions close to the other display panels 2 in the oblique directions intersecting with the two directions among the corner portions of the display panels are cut, thereby making the display panels 2 with the positional relations in the oblique directions closer to each other.

Each cut corner portion has the shape formed by cutting the portion at the outer side relative to the straight line connecting the two intersections of the two straight lines LA and LB provided by extending the two boundary lines closer to the corner portion among the boundary lines between the rectangular display region 100 and the frame-like non-display region 101 surrounding the display region 100 and the two straight lines LC and LD in the directions tracing the two sides of the display panel 2 that are in contact with the corner portion. With this, the display regions 100 can be made closer to each other in the two orthogonal directions.

As for the pair of display panels 2 close to each other in the oblique direction intersecting with the two directions, both of the positions of the display panels 2 in the overlap direction are at the display surface side or the rear surface side relative to another pair of display panels 2 close to each other in the oblique direction. With this, the thickness of the display parts 95 in the thickness of the entire display device 1 can be reduced to the thickness for the display parts 95 of the two display panels 2. In addition, various design matters such as the overlap and the step shapes in the display device 1 can be balanced more easily in the direction along the display surfaces 102.

The coupled display region at the display surface side can be made flat by including the cover 140. With this, the light traveling directions (reflection direction, scattering direction, and the like) at the display surface side can be made uniform more easily on the entire coupled display region.

The coupled display region of the display device 1 at the display surface side can be made flat with the simple configuration by including the cover member 141 or 141a in the cover 140.

Because the shape of the cover member 141a at the side of the display panels 2 (for example, the display panels 2a and 2b) are the step shape corresponding to the steps between the polarizers 90 of the plurality of display panels 2, the gaps between the cover member 141a and the rear-panels 2B at the farther positions from the cover member 141a can be made smaller. In addition, the positional relation (the display surface side, the rear surface side, and the like) of the plurality of display panels 2 can be specified more easily by arranging the plurality of display panels 2 so as to fit the steps of the cover member 141a. The cover member 141a can therefore be used to guide an operation related to coupling of the display panels 2 in manufacturing of the display device 1.

Because the gaps between the cover member 141 or 141a and the display panels 2 (for example, the display panels 2a and 2b) are filled with the filler 142, the traveling directions of light passing through the cover member 141 or 141a can be made uniform more easily.

The film 143 can further be used to moderate the steps between the plurality of display panels 2 (for example, the display panels 2a and 2b) that are coupled at the display surface side.

Because the polarization plates 26A are provided at the rear surface side, the degrees of extension or contraction of the polarization plates 26 and 26A can be made more approximate between the display surface side and the rear surface side of the display parts 95. This can reduce the possibility that the display panels 2 are warped with the extension or the like of the polarization plates 26.

Because the display panels 2 are the reflective liquid crystal display panels, components included in backlights can be omitted. The thickness of the display device 1 can therefore be reduced.

(Modifications)

Next, modifications of the present invention will be described. As the specific configuration of the display device 1, the same mode as that described above can be employed other than matters that are specially mentioned in the modifications.

(First Modification)

Figure 28:
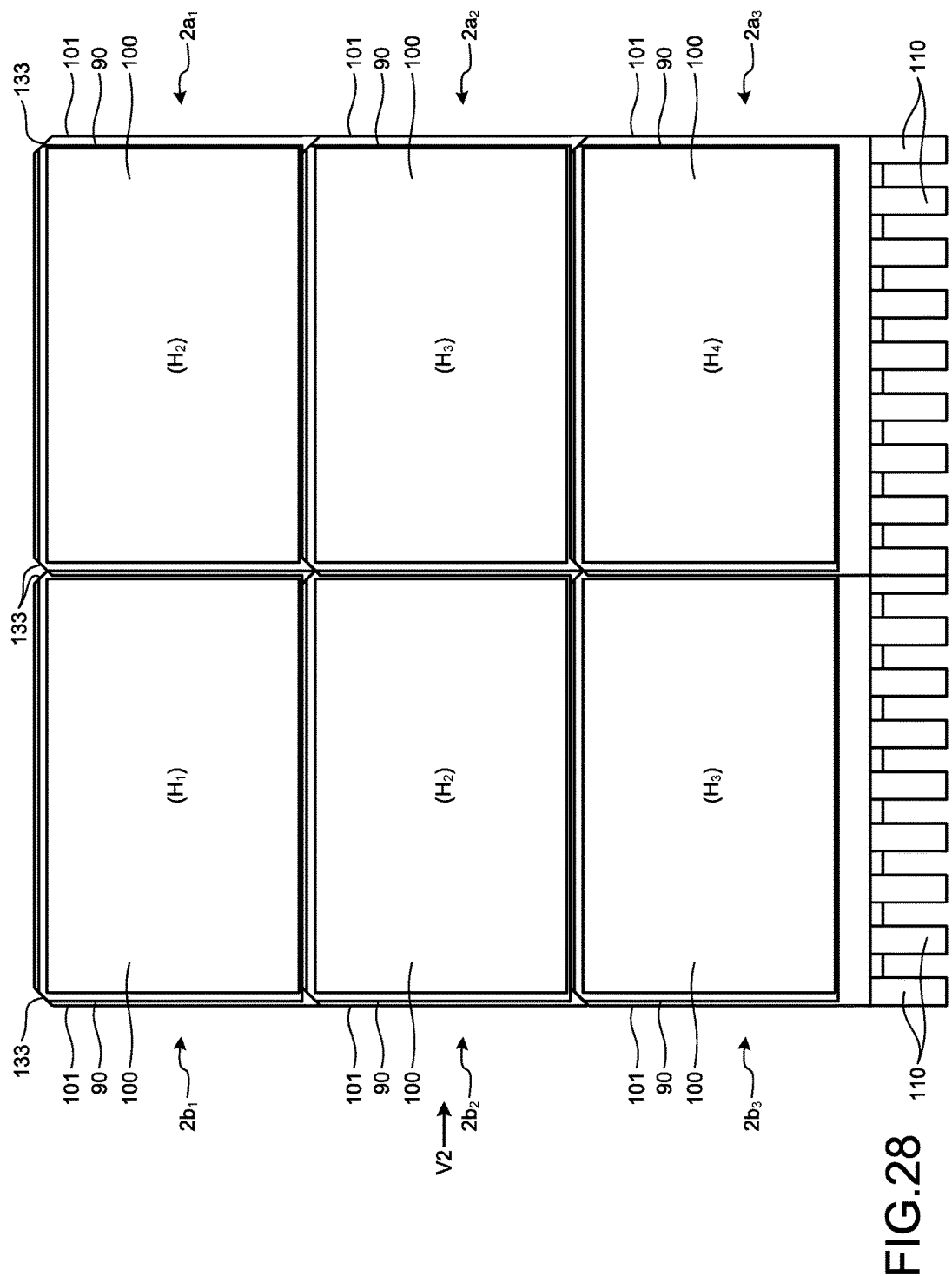
FIG. 28 is a view illustrating an example of the configuration of a display device according to a first modification of the present invention.
Figure 29:
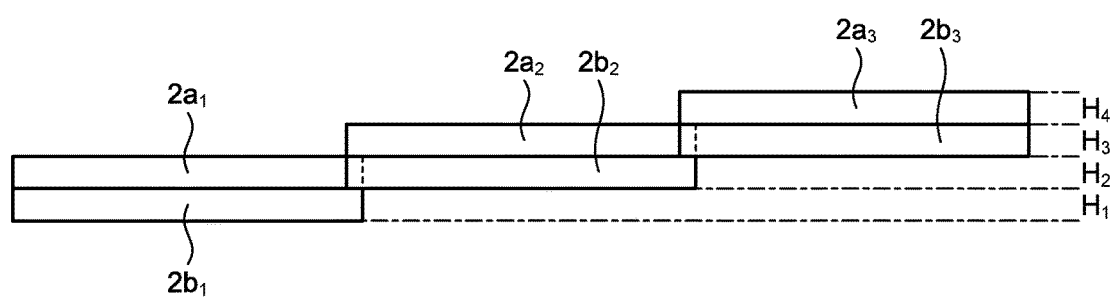
FIG. 29 is a schematic view illustrating a positional relation among display panels illustrated in FIG. 28.

FIG. 28 is a view illustrating an example of the configuration of a display device according to a first modification of the present invention. FIG. 29 is a schematic view illustrating a positional relation among the display panels $2a_1$, $2a_2$, $2a_3$, $2b_1$, $2b_2$, and $2b_3$ illustrated in FIG. 28. FIG. 29 illustrates the positional relation when seen from the direction of an arrow V2. FIG. 28 and FIG. 29 indicate positions in the overlap direction by $H_1$, $H_2$, $H_3$, and $H_4$ where the $H_4$ side corresponds to the display surface side and the $H_1$ side corresponds to the rear surface side. As illustrated in FIG. 28 and FIG. 29, the display device in the first modification has a coupled display region in which, for example, the display panels $2a_1$, $2a_2$, $2a_3$, $2b_1$, $2b_2$, and $2b_3$ forming six rectangular display panels 2 are coupled in an arrangement of 2×3 along the two orthogonal directions (for example, the X direction and the Y direction, which will be described later). That is to say, in the first modification, at least two rectangular display panels 2 are coupled in the respective two directions intersecting with (for example, orthogonal to) each other.

In the example illustrated in FIG. 28, the display panels $2b_1$, $2b_2$, and $2b_3$ aligned along the Y direction at one end side (the left side in FIG. 28) in the X direction are located at the rear surface side relative to the display panels $2a_1$, $2a_2$, and $2a_3$ aligned along the Y direction at the other end side (the right side in FIG. 28), respectively. In other words, the display panels $2a_1$, $2a_2$, and $2a_3$ are located at the display surface side relative to the display panels $2b_1$, $2b_2$, and $2b_3$, respectively.

In the example illustrated in FIG. 28, the display panel $2b_1$ arranged at one end side (the upper end side in FIG. 28) in the Y direction is located at the rear surface side relative to the display panel $2b_2$ arranged at the other end side (on a center portion in the up-down direction in FIG. 28) thereof. The display panel $2b_2$ is located at the rear surface side relative to the display panel $2b_3$ arranged at the other end side (the lower end side in FIG. 28) thereof. In other words, the display panel $2b_3$ is located at the display surface side relative to the display panel $2b_2$. The display panel $2b_2$ is located at the display surface side relative to the display panel $2b_1$. The relative positional relation of an overlap state among the three display panels $2a_1$, $2a_2$, and $2a_3$ and the relative positional relation of the overlap state among the three display panels $2b_1$, $2b_2$, and $2b_3$ are the same. As described above, in the first modification, the plurality of display panels 2 that are coupled along the Y direction have the same relative positional relation of the overlap state on the display panels 2 arranged at one end side thereof. In the first modification, fourth and subsequent display panels 2 may be provided in the Y direction with the same positional relation in the overlap direction. To be specific, the display panels 2 located at the display surface side relative to the respective display panel $2a_3$ and $2b_3$ may be provided at the other end side in the Y direction. Fifth and subsequent display panels 2 are provided so as to be located at the display surface side relative to the added fourth and subsequent display panels 2 at the other end side thereof.

In the first modification, in at least one direction (Y direction) of the two directions, the plurality of display panels 2 that are coupled along the one direction have the same relative positional relation of the overlap state on the display panels 2 arranged at one end side in the one direction. In the first modification, the plurality of display panels 2 that are coupled along the X direction may have the same or different relative positional relation of the overlap state on the display panels 2 arranged at one end side. When the display panels 2 that are coupled along the X direction have the same relative positional relation of the overlap state, the display panels 2 located at the display surface side relative to the display panels $2a_1$, $2a_2$, and $2a_3$ are provided at the other end side thereof in the X direction. As a specific example, the positions of the display panels $2b_1$ and $2a_1$ aligned in the X direction in the overlap direction are $H_1$ and $H_2$, respectively. In this case, the position of the display panel 2 that is coupled to the display panel $2a_1$ at the opposite side to the display panel $2b_1$ in the overlap direction is $H_3$. The positions of the display panels $2b_2$ and $2a_2$ aligned in the X direction in the overlap direction are $H_2$ and $H_3$, respectively. In this case, the position of the display panel 2 that is coupled to the display panel $2a_2$ at the opposite side to the display panel $2b_2$ in the overlap direction is $H_4$. The positions of display panels $2b_3$ and $2a_3$ aligned in the X direction in the overlap direction are $H_3$ and $H_4$, respectively. In this case, the position of the display panel 2 that is coupled to the display panel $2a_3$ at the opposite side to the display panel $2b_3$ is located at the display surface side relative to $H_4$. The fourth and subsequent display panels 2 are provided so as to be located at the display surface side relative to the added third and subsequent display panels 2 at the other end side thereof. On the other hand, when the display panels 2 that are coupled along the X direction have the different relative positional relation of the overlap state, the display panels 2 located at the rear surface side relative to the display panels $2a_1$, $2a_2$, and $2a_3$ are provided at the other end side thereof in the X direction. The fourth display panels 2 are provided so as to be located at the display surface side relative to the added third display panels at the other end side thereof. That is to say, in this case, the display panels 2 located at $(2n-1)^{th}$ positions counting from one end side can have the same positional relation of the overlap state as the display panels 2 located at $2n^{th}$ positions (wherein n is equal to or more than 1). As a specific example, the positions of the display panels $2b_1$ and $2a_1$ aligned in the X direction in the overlap direction are $H_1$ and $H_2$, respectively. In this case, the position of the display panel 2 that is coupled to the display panel $2a_1$ at the opposite side to the display panel $2b_1$ in the overlap direction is $H_1$. The positions of display panels $2b_2$ and $2a_2$ aligned in the X direction in the overlap direction are $H_2$ and $H_3$, respectively. In this case, the position of the display panel 2 that is coupled to the display panel $2a_2$ at the opposite side to the display panel $2b_2$ in the overlap direction is $H_2$. The positions of the display panels $2b_3$ and $2a_3$ aligned in the X direction in the overlap direction are $H_3$ and $H_4$, respectively. In this case, the position of the display panel 2 that is coupled to the display panel $2a_3$ at the opposite side to the display panel $2b_3$ is $H_3$. In this manner, the two display panels 2 that are coupled to each other at adjacent positions in the other direction (X direction) of the two directions may have the different positional relation of the overlap state on the display panels 2 at one end side in the one direction.

With the relative positional relation of the overlap state of the display panels 2 as in the first modification, addition of the display panels 2 included in the coupled display region can be made easier.

In the first modification, the display panels 2 are coupled in the Y direction such that the wires 110 of the display panels 2 at the rear surface side are located at positions of being shielded by the display surface side of the display panels 2 at the display surface side. In the first modification, the plurality of display panels 2 that are coupled in the X direction are directed such that the wires 110 extend to the same direction. In the first modification, the two corner portions located at the opposite side to the extending direction of the wires 110 are cut. To be specific, each of the display panels $2a_1$, $2a_2$, $2a_3$, $2b_1$, $2b_2$, and $2b_3$ has the two cut portions 133 at the opposite side to the extending direction of the wire 110. In the first modification, the cut of the corner portions may be omitted.

(Second Modification)

Figure 30:
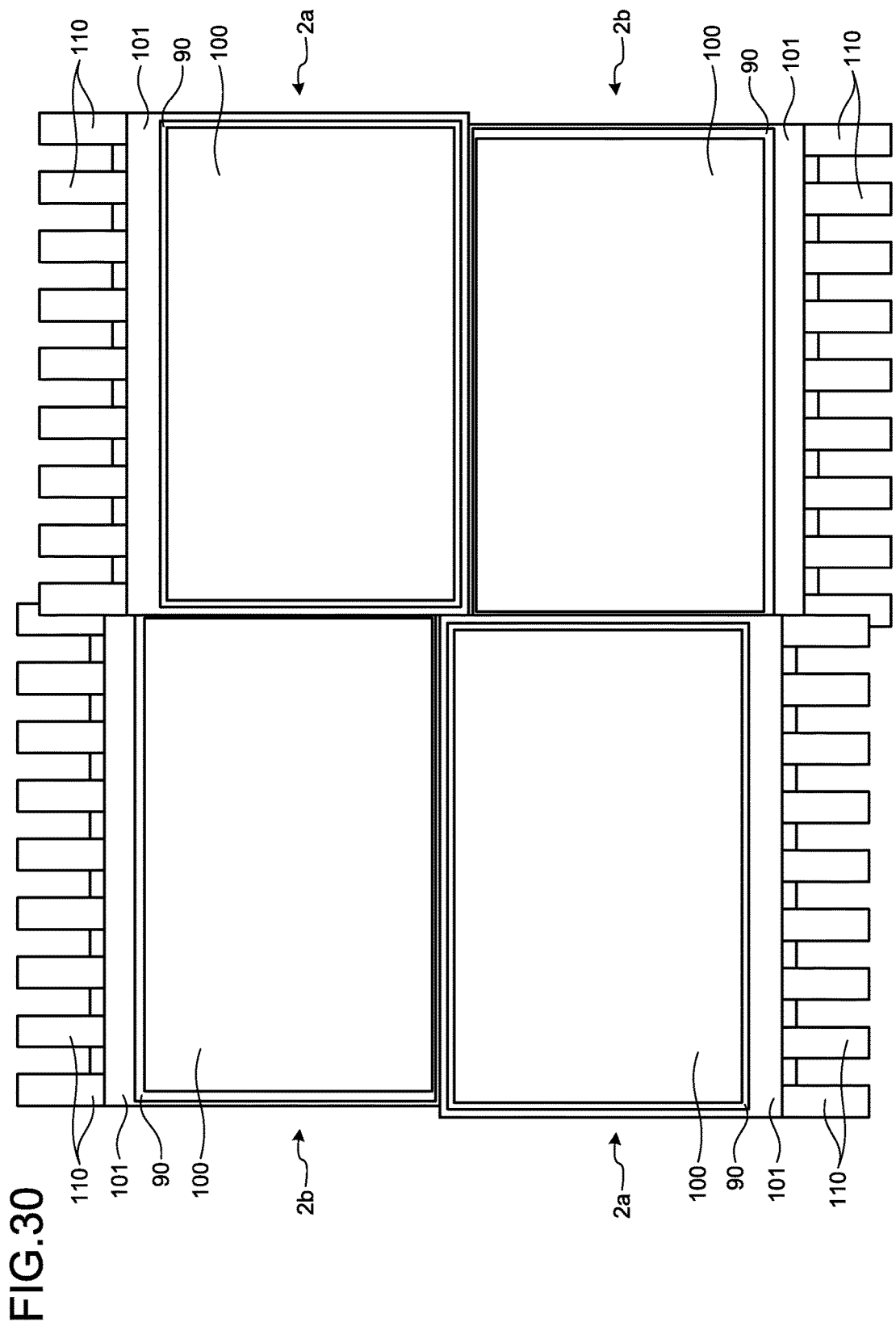
FIG. 30 is a view illustrating an example of the configuration of a display device according to a second modification of the present invention.

FIG. 30 is a view illustrating an example of the configuration of a display device according to a second modification of the present invention. The display device in the second modification has a coupled display region in which the two display panels 2a and the two display panels 2b as the four rectangular display panels 2 are coupled two by two along the two directions intersecting with each other. The two intersecting directions are not necessarily orthogonal to each other. To be specific, in the display device illustrated in FIG. 30, the two display panels 2a and 2b adjacent to each other in the X direction have a positional relation of deviating from each other in the Y direction. The two display panels 2a and 2b adjacent to each other in the Y direction have a positional relation of deviating from each other in the X direction. To be more specific, the display panels 2b and 2a arranged at the left side in FIG. 30 deviate to the upper side relatively to the display panels 2a and 2b arranged at the right side. The display panels 2b and 2a arranged at the upper side in FIG. 30 deviate to the right side relatively to the display panels 2a and 2b arranged at the rear surface side. By employing the above-mentioned deviating arrangement, one sides (for example, the long sides located at the opposite side to the wires 110) of the display regions 100 of the two display panels 2a located at the upper side relative to the display panels 2b in the overlap direction can be positioned without cutting the corner portions.

The display device in the second modification is the same as the display device 1 in the embodiment except for the two coupling directions and the corner portions that are not cut.

(Third Modification)

Figure 31:
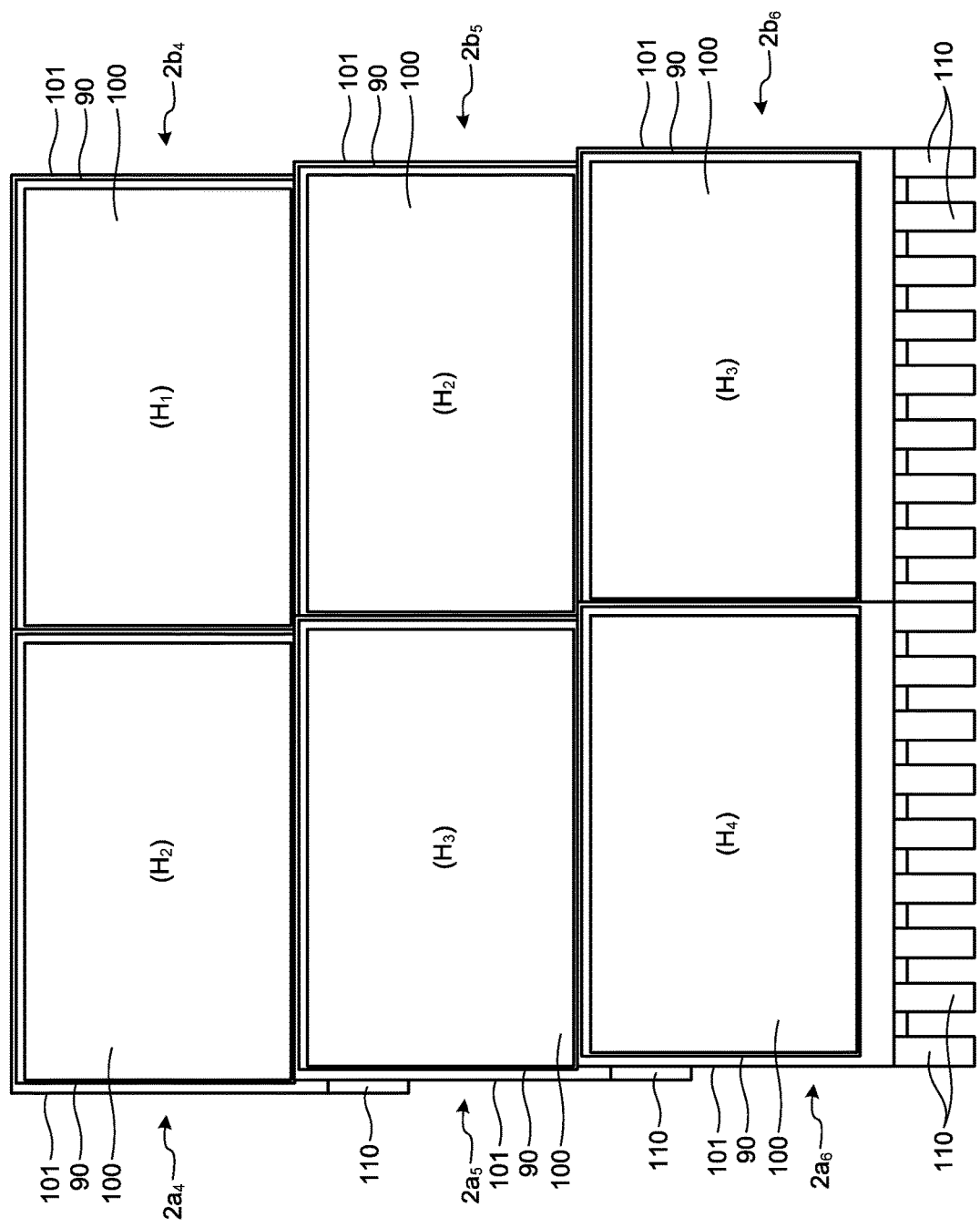
FIG. 31 is a view illustrating an example of the configuration of a display device according to a third modification of the present invention.

FIG. 31 is a view illustrating an example of the configuration of a display device according to a third modification of the present invention. The display device in the third modification has a coupled display region in which, for example, the display panels $2a_4$, $2a_5$, $2a_6$, $2b_4$, $2b_5$, and $2b_6$ forming six rectangular display panels 2 are coupled in an arrangement of 2×3 along the two intersecting directions. Like the two directions in the second modification, the two intersecting directions as the coupling directions of the display panels 2 in the third modification are not necessarily orthogonal to each other.

In the example illustrated in FIG. 31, the display panels $2b_4$, $2b_5$, and $2b_6$ that are coupled at one end side (the right side in FIG. 31) in the X direction are located at the rear surface side relative to the display panels $2a_4$, $2a_5$, and $2a_6$ that are coupled at the other end side (the left side in FIG. 31), respectively. In the example illustrated in FIG. 31, the display panel $2b_4$ arranged at one end side (the upper side in FIG. 31) in the Y direction is located at the rear surface side relative to the display panel $2b_5$ arranged at the other end side (a center portion in the up-down direction in FIG. 31) thereof. The display panel $2b_5$ is located at the rear surface side relative to the display panel $2b_6$ arranged at the other end side (the lower end side in FIG. 31) thereof. The relative positional relation of the overlap state among the three display panels $2a_4$, $2a_5$, and $2a_6$ and the relative positional relation of the overlap state among the three display panels $2b_4$, $2b_5$, and $2b_6$ are the same. As described above, in the third modification, regarding at least one of the two directions, the plurality of display panels 2 that are coupled along the one direction have the same relative positional relation of the overlap state on the display panels 2 arranged at one end side in the one direction. As a specific example, the positions of the display panels $2b_4$, $2a_4$, $2b_5$, $2a_5$, $2b_6$, and $2a_6$ aligned in the X direction are $H_1$, $H_2$, $H_2$, $H_3$, $H_3$, and $H_4$ (see FIG. 29) in the overlap direction, respectively.

In the third modification, the display panels 2 are coupled in the Y direction such that parts of the wires 110 of the display panels 2 at the rear surface side are located at positions of being shielded by the display surface side of the display panels 2 at the display surface side. In the third modification, the plurality of display panels 2 adjacent to each other in the X direction are directed such that the wires 110 extend to the same direction. The display device in the third modification may include equal to or more than 2×3 of the display panels 2 in the two intersecting directions as in the first modification. In this case, rules related to the relative positional relation of the overlap state from one end side to the other end side are the same as those in the first modification.

(Fourth Modification)

Figure 32:
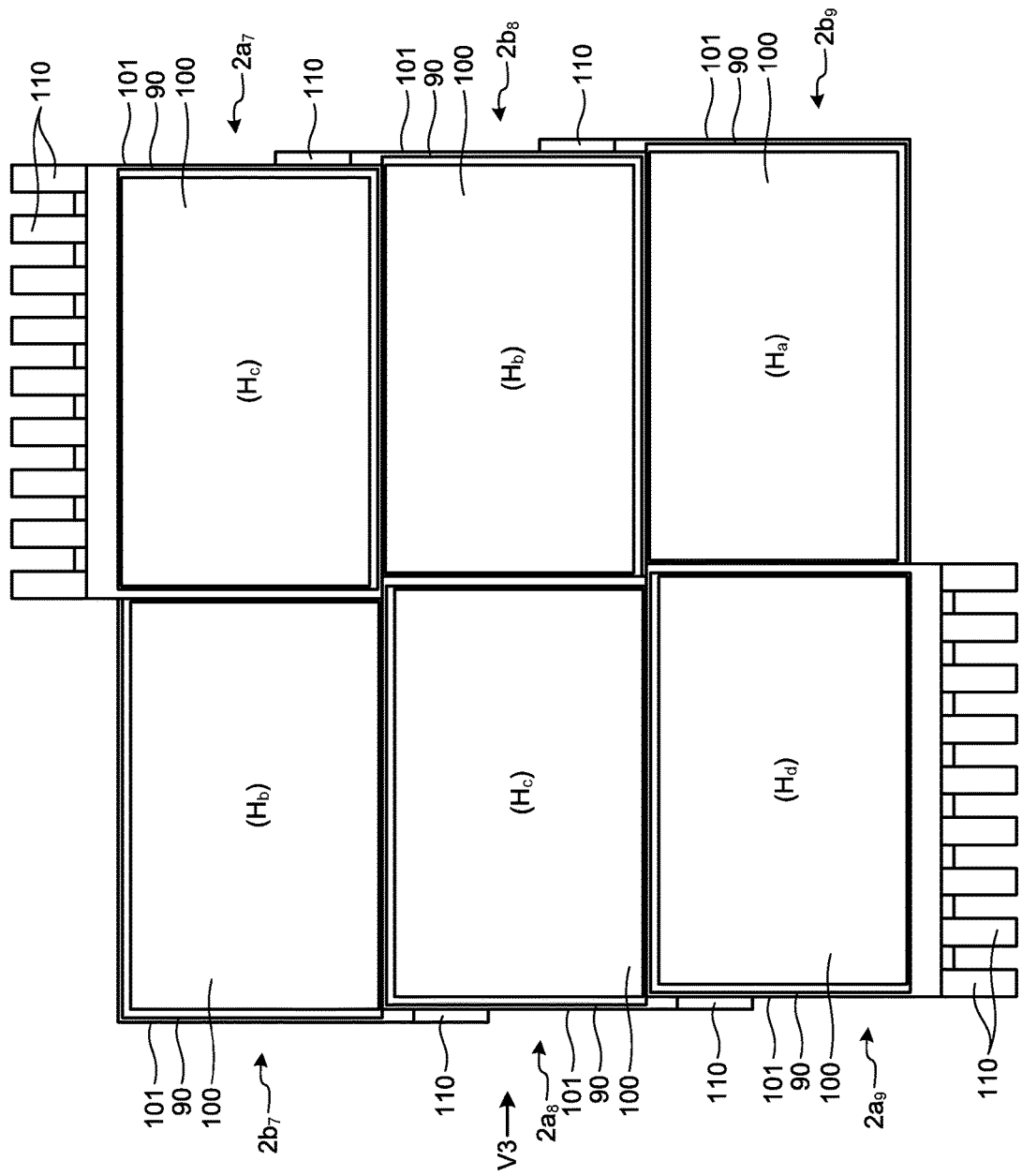
FIG. 32 is a view illustrating an example of the configuration of a display device according to a fourth modification of the present invention.
Figure 33:
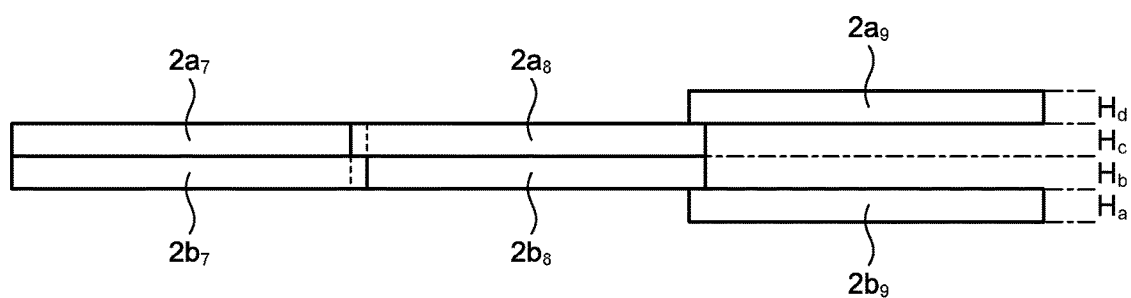
FIG. 33 is a schematic view illustrating a positional relation of display panels illustrated in FIG. 32.

FIG. 32 is a view illustrating an example of the configuration of a display device according to a fourth modification of the present invention. FIG. 33 is a schematic view illustrating a positional relation among the display panels $2a_7$, $2a_8$, $2a_9$, $2b_7$, $2b_8$, and $2b_9$ illustrated in FIG. 32. FIG. 33 illustrates the positional relation when seen from the direction of an arrow V3. FIG. 32 and FIG. 33 indicate positions of the display panels in the overlap direction by $H_a$, $H_b$, $H_c$, and $H_d$ where the $H_d$ side corresponds to the display surface side and the $H_a$ side corresponds to the rear surface side. The display device in the fourth modification has a coupled display region in which, for example, the display panels $2a_7$, $2a_8$, $2a_9$, $2b_7$, $2b_8$, and $2b_9$ forming six rectangular display panels 2 are coupled in an arrangement of 2×3 along the two intersecting directions. Like the two directions in the second modification and the third modification, the two intersecting directions as the coupling directions of the display panels 2 in the fourth modification are not necessarily orthogonal to each other.

In the fourth modification, the display panels 2 are coupled in the Y direction such that parts of the wires 110 of the display panels 2 at the rear surface side are located at positions of being shielded by the display surface side of the display panels 2 at the display surface side. In the fourth modification, the display panels 2 adjacent to each other in the X direction are directed such that the wires 110 extend to the opposite directions. When third and subsequent display panels 2 are provided in the X direction in the fourth modification, the wires 110 of the display panels 2 located at $(2n-1)^{th}$ positions counting from one end side are made to extend to the same directions and the wires 110 of the display panels 2 located at $2n^{th}$ positions are made to extend to the same directions whereas the wires 110 of the display panels 2 located at the $(2n-1)^{th}$ positions and the wires 110 in the display panels 2 located at the $2n^{th}$ positions are made to extend to the opposite directions.

In the example illustrated in FIG. 32, the display panel $2b_7$ arranged at one end side (the upper end side in FIG. 32) in the Y direction is located at the rear surface side relative to the display panel $2a_8$ arranged at the other end side (on a center portion in the up-down direction in FIG. 32) thereof. The display panel $2a_8$ is located at the rear surface side relative to the display panel $2a_9$ arranged at the other end side (the lower end side in FIG. 32) thereof. The display panel $2a_7$ arranged at one end side in the Y direction is located at the display surface side relative to the display panel $2b_8$ arranged at the other end side thereof. The display panel $2b_8$ is located at the display surface side relative to the display panel $2b_9$ arranged at the other end side (the lower end side in FIG. 32) thereof. Thus, in the fourth modification, each of the display panel columns included in the plurality of display panels 2 that are coupled along one direction of the two directions has the same relative positional relation of the overlap state on the display panels 2 arranged at one end side in the one direction. Also in the fourth modification, the fourth and subsequent display panels 2 can be provided in the one direction with the same rules as those in the first modification and the third modification.

The plurality of display panels 2 having the above-mentioned relative positional relation of the overlap state in each of the display panel columns have a non-abutment relation in which the display panels 2 do not necessarily overlap directly in the other direction as the different direction from the direction of the display panel column. To be specific, the display panel $2a_7$ and the display panel $2b_7$ overlap with each other based on the positional relation in which the display panel $2a_7$ is at the display surface side and the display panel $2b_7$ is at the rear surface side. The display panel $2a_8$ and the display panel $2b_8$ overlap with each other based on the positional relation in which the display panel $2a_8$ is at the display surface side and the display panel $2b_8$ is at the rear surface side. The display panel $2a_9$ overlaps only with the display panel $2a_8$ adjacent thereto in the Y direction and does not directly overlap with the display panel $2b_9$ adjacent thereto in the X direction. As a specific example, the positions of the display panels $2b_7$, $2a_7$, $2b_8$, $2a_8$, $2b_9$, and $2a_9$ aligned in the X direction are $H_a$, $H_b$, $H_b$, $H_c$, $H_c$, and $H_d$ in the overlap direction, respectively. An apparent overlap portion between the display panel $2a_9$ and the display panel $2b_9$ when seen from the display surface side is the same as overlap ranges (for example, see the overlap range W5 or the overlap range W6 in the embodiment) of the two display panels 2 that directly overlap with each other in the X direction.

When the third and subsequent display panels 2 are provided in the X direction in the fourth modification, the display panel column adjacent to the display panel column of the display panels $2a_7$, $2b_8$, and $2b_9$ at the other end side is the same display panel column of the display panels $2b_7$, $2a_8$, and $2a_9$. Furthermore, the display panel column adjacent thereto at the other end side is the same display panel column of the display panels $2a_7$, $2b_8$, and $2b_9$.

In the above-mentioned embodiment and modifications, the display device includes equal to or more than four display panels 2. Alternatively, it is sufficient that the display device includes at least two display panels 2. One of the two display panels 2 is located at the display surface side and the other thereof is located at the rear surface side.

Although in the above-mentioned embodiment and modifications, the display panels 2 and the display regions 100 have the rectangular shapes, the specific shapes of the display panels 2 and the display regions 100 can be appropriately changed. Regardless of the specific shapes of the display panels 2 and the display regions 100, the thickness in the overlap direction can be reduced by preventing the polarizers of the display panels at the rear surface side from extending to the overlap ranges in the overlap between the non-display regions 101.

Other effects provided by the modes described in the embodiment that are obviously induced from the present specification or of which those skilled in the art can conceive appropriately are interpreted to be provided by the present invention, of course.

What is claimed is:

1. A display device having a plurality of display panels, which display an image formed by a plurality of pixels, coupled to each other comprising:
   each of the display panels including,
     a display surface having a display region and a non-display region surrounding the display region, and
     a polarizer provided on the display surface, wherein
   the polarizer covers both the display region and a part of the non-display region,
   a pair of display panels are coupled with stacking a part of the non-display region each other,
   one display panel, as a front-panel, is located at a display surface side of the other display panel, and the other display panel, as a rear-panel, is located at a rear surface side of the front-panel, the rear surface side opposed to the display surface side,
   the front-panel has side surfaces including a front-panel side surface located closest to a rear-polarizer side surface of the polarizer included in the rear-panel, and
   the rear-polarizer side surface of the rear-panel opposes the front-panel side surface of the front-panel.

2. The display device according to claim 1, wherein the polarizers do not cover a part of the non-display regions where other display panels are mounted.

3. The display device according to claim 1, wherein the polarizer of the front-panel covers a part of the non-display region at which the rear-panel is overlapping.

4. The display device according to claim 1, wherein the front-panel is contiguous the rear-panel.

5. The display device according to claim 1, wherein
   at least one of the two display panels that overlap with each other has a thin portion processed to make a thickness in an overlap direction smaller than thicknesses at other positions, the thin portion formed at an position where the two display panels abut against each other, when the thin portion is provided on the front-panel, the thin portion is provided at the rear surface side on the display panel, and when the thin portion is provided on the rear-panel, the thin portion is provided at the display surface side on the display panel.

6. The display device according to claim 1, wherein some pixels of the plurality of pixels are dummy pixels located in the non-display region, a light shield between the dummy pixels and the display surface and defining a boundary between the display region and the non-display region is provided in the non-display region, and the front-panel side surface located closest to the rear-polarizer side surface of the polarizer included in the rear-panel is located on the boundary of rear-panel.

7. The display device according to claim 1, wherein an angle of the display panels is an angle determined based on an incident direction of light from a light source of the display panels and a positional relation between the display device and a viewer position that corresponds to viewing an image displayed on a coupled display region.

8. The display device according to claim 1, wherein the display device has a coupled display region in which four rectangular display panels are connected to each other along two orthogonal directions, and a corner of each of the rectangular display panels close to another display panel is cut in an oblique direction intersecting with the two orthogonal directions.

9. The display device according to claim 8, wherein the corner has a shape formed by cutting at least a portion at an outer side relative to a straight line connecting two intersections of a combination of straight lines around the corner, two of the combination of the straight lines are ones extending two boundary lines between the display region and the non-display region to the outer side of the display panel, the other two of the combination of the straight lines are ones extending two outer side of the display panel.

10. The display device according to claim 8, wherein a pair of the display panels close to each other in the oblique direction intersecting with the two directions are the front-panels, and the rest of the display panels are the rear-panels.

11. The display device according to claim 1, wherein equal to or more than two rectangular display panels are coupled to each other in each of two intersecting directions, and in one direction of the two directions, the display panels that are coupled to each other along the one direction have a same relative overlap state.

12. The display device according to claim 11, wherein two display panels that are coupled to each other at adjacent positions in the other direction of the two directions have a different overlap state from the same relative overlap state.

13. The display device according to claim 1, further comprising a transparent cover covering at least a part of a coupled display region at the display surface side so as to make the display surface in the coupled display region planar.

14. The display device according to claim 13, wherein the cover includes a cover member covering all the coupled display panels at the display surface side.

15. The display device according to claim 14, wherein the cover member at the display panel side has a step corresponding to steps between the polarizers of the display panels.

16. The display device according to claim 14, wherein the cover includes a filler that fills gaps between the cover member and the display panels.

17. The display device according to claim 1, further comprising a film located on the polarizer of the rear-panel, wherein the film has a thickness corresponding to a step between the polarizer provided of the rear-panel and the polarizer of the front-panel.

18. The display device according to claim 1, wherein each of the display panels includes a respective polarizer at an opposite side to the display surface.

19. A display device having a coupled display region in which a plurality of display panels each including a display part having a plurality of pixels are coupled, the coupled display region being larger than a display region by the display part, a display panel of the plurality of display panels comprising:

a display surface having a display region and a non-display region surrounding the display region; and a polarizer provided on the display surface, wherein the display panel overlaps at least one of the other display panels of the display device in an overlap area, and the polarizer covers the display region and at least a part of the non-display region outside the overlap area in which the display panel overlaps the at least one of the other display panels of the display device.

* * * * *

UNITED STATES PATENT AND TRADEMARK OFFICE
CERTIFICATE OF CORRECTION

PATENT NO. : 10,330,967 B2
APPLICATION NO. : 15/383549
DATED : June 25, 2019
INVENTOR(S) : Masaya Tamaki et al.

Page 1 of 1

It is certified that error appears in the above-identified patent and that said Letters Patent is hereby corrected as shown below:

Page 2, Column 1, References Cited: Under Foreign Patent Documents, Line 11, Remove the duplicated reference "2013-156452 A" with date 2/2014.

Signed and Sealed this
Tenth Day of September, 2019

Andrei Iancu
*Director of the United States Patent and Trademark Office*